(12) United States Patent
Jang et al.

(10) Patent No.: US 8,990,656 B2
(45) Date of Patent: Mar. 24, 2015

(54) METHOD FOR TRANSMITTING UPLINK CONTROL INFORMATION IN A WIRELESS ACCESS SYSTEM AND TERMINAL FOR SAME

(75) Inventors: Jiwoong Jang, Anyang-si (KR);
Jaehoon Chung, Anyang-si (KR);
Seunghee Han, Anyang-si (KR);
Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 13/885,452

(22) PCT Filed: Nov. 17, 2011

(86) PCT No.: PCT/KR2011/008801
§ 371 (c)(1),
(2), (4) Date: May 15, 2013

(87) PCT Pub. No.: WO2012/067443
PCT Pub. Date: May 24, 2012

(65) Prior Publication Data
US 2013/0238954 A1 Sep. 12, 2013

Related U.S. Application Data

(60) Provisional application No. 61/414,852, filed on Nov. 17, 2010.

(51) Int. Cl.
*G11C 29/00* (2006.01)
*H04L 1/00* (2006.01)
(Continued)

(52) U.S. Cl.
CPC ............ *H04L 1/0061* (2013.01); *H04L 1/0073* (2013.01); *H04L 5/0007* (2013.01);
(Continued)

(58) Field of Classification Search
CPC ... H04L 1/0061; H04L 1/0073; H04L 5/0007; H04L 5/0053; H04L 5/0055; H04L 5/0023; H04L 2001/125
See application file for complete search history.

(56) References Cited

U.S. PATENT DOCUMENTS

2011/0243066 A1* 10/2011 Nayeb Nazar et al. ....... 370/328
2011/0271169 A1* 11/2011 Pi .................................. 714/807
(Continued)

OTHER PUBLICATIONS

Panasonic, "UCI Resource Size of Retransmission on PUSCH with SU-MIMO Transmission," 3GPP TSG RAN WG1 Meeting #62bis, Agenda Item 6.4.2, R1-105495, Oct. 11-15, 2010, Xi'an, China, 3 pages.*

(Continued)

*Primary Examiner* — John P Trimmings
(74) *Attorney, Agent, or Firm* — Birch, Stewart, Kolasch & Birch, LLP

(57) ABSTRACT

The present invention relates to a method for transmitting uplink control information in a wireless access system and a terminal for the same. More particularly, the method comprises the following steps: attaching, if the bit size of uplink control information is larger than a preset number, cyclic redundancy check to the uplink control information; calculating the number of wireless resource elements for transmitting the uplink control information to which the CRC is attached; coding the uplink control information to which the CRC is attached, using a tail biting convolutional coding (TBCC) technique, based upon the calculated number of the wireless resource elements; and transmitting a physical uplink shared channel signal containing the coded uplink control information to a base station, wherein the uplink control information is either hybrid automatic repeat and request acknowledgement/negative acknowledgement (HARQ-ACK/NACK) information or rank indication (RI) information.

16 Claims, 19 Drawing Sheets

(51) Int. Cl.
*H04L 5/00* (2006.01)
*H04L 1/12* (2006.01)

(52) U.S. Cl.
CPC ............ *H04L5/0023* (2013.01); *H04L 5/0053* (2013.01); *H04L 5/0055* (2013.01); *H04L 2001/125* (2013.01)
USPC ........................................................ 714/758

(56) References Cited

U.S. PATENT DOCUMENTS

2011/0274071 A1* 11/2011 Lee et al. ....................... 370/329
2012/0069793 A1* 3/2012 Chung et al. .................. 370/315
2012/0320852 A1* 12/2012 Seo et al. ....................... 370/329

OTHER PUBLICATIONS

ASUSTeK, "Resource Size Calculation for AN and RI Multiplexing on MIMO PUSCH," 3GPP TSG RAN WG1 Meeting #62bis, Agenda Item 6.4.2, R1-105296, Oct. 11-15, 2010, Xi'an, China, 3 pages.

Huawei et al., "HARQ-ACK and RI Multiplexing on PUSCH in Case of SU-MIMO," 3GPP TSG RAN WG1 Meeting #62bis, Agenda Item 6.4.2, R1-105138, Oct. 11-15, 2010, Xi'an, China, 8 pages.

Samsung, "UCI Resources for Single Codeword PUSCH," 3GPP TSG RAN WG1 #62bis, Agenda Item, 6.4.2, R1-105392, Oct. 11-15, 2010, Xi'an, China, 2 pages.

* cited by examiner (a)

(b)

METHOD FOR TRANSMITTING UPLINK CONTROL INFORMATION IN A WIRELESS ACCESS SYSTEM AND TERMINAL FOR SAME

This application is the National Phase of PCT/KR2011/008801 filed on Nov. 17, 2011, which claims priority under 35 U.S.C. 119(e) to U.S. Provisional Application No. 61/414,852 filed on Nov. 17, 2010, all of which are hereby expressly incorporated by reference into the present application.

FIELD OF THE INVENTION

The present invention relates to a wireless communication system and, more particularly, to a method for transmitting uplink control information in a wireless access system and a device supporting the same.

BACKGROUND ART

Among the many requirements of a next generation wireless access system, one of the most important requirements corresponds to being capable of supporting a high data transmission rate demand. In order to do so, a wide range of technologies, such as MIMO (Multiple Input Multiple Output), CoMP (Cooperative Multiple Point transmission), relay, and so on, are being extensively researched.

In the related art wireless access system, a single carrier was generally considered even though the uplink bandwidth and the downlink bandwidth were set to be different from one another. For example, in a single carrier basis, a wireless communication system, wherein the number of carriers configuring the uplink and the downlink is respectively equal to 1, and wherein the uplink bandwidth and the downlink bandwidth are symmetrical to one another, was generally provided.

However, considering the fact that the frequency resources are in a saturated state, as a solution for ensuring wideband bandwidth in order to meet with the higher data transmission rate demand, CA (carrier aggregation) is being adopted, wherein CA refers to a concept of designing each of the scattered bands to be capable of meeting with the basic (or essential) requirement of operating an independent system and of grouping (or aggregating) multiple bands to a single system.

Herein, a carrier corresponding to a bandwidth unit available for independent management may be referred to as a CC (Component Carrier). In order to support the increasing transmission capacity, the recent 3GPP LTE-A or 802.16m is extending its bandwidth to 20 MHz or more. In this case, one or more component carriers are aggregated so as to support the wideband. For example, if one component carrier supports a bandwidth of 5 MHz, 10 MHz, or 20 MHz, a maximum of 5 component carriers may be grouped (or aggregated), so as to support a system bandwidth of up to 100 MHz.

In case of using the carrier aggregation technology, data may be simultaneously transceived (or transmitted and/or received) through multiple uplink/downlink component carriers. Therefore, the user equipment may be capable of monitoring and measuring all component carriers.

DETAILED DESCRIPTION OF THE INVENTION

Technical Objects

An object of the present invention proposes a method for easily transmitting uplink control information and a device for the same in a wireless access system, preferably, in a wireless communication system supporting a carrier aggregation environment.

Additionally, another object of the present invention proposes a method for encoding uplink control information and a device for the same in a wireless communication system supporting a carrier aggregation environment Furthermore, a further object of the present invention proposes a method for enhancing transmission performance of the uplink control information and a device for the same in a wireless communication system supporting a carrier aggregation environment.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In an aspect of the present invention, in a method for transmitting Uplink Control Information in a wireless communication system, an uplink control information transmitting method includes the steps of, when a bit size of the uplink control information is equal to or greater than a predetermined number, adding a CRC (Cyclic Redundancy Check) to the uplink control information, calculating a number of radio resource elements for transmitting the uplink control information having the CRC added thereto, coding the uplink control information having the CRC added thereto by using a TBCC (Tail Biting Convolutional Coding) coding method in accordance with the calculated number of radio resource elements, and transmitting a Physical Uplink Shared Channel signal having the coded uplink control information included therein to a base station, wherein the uplink control information may correspond to any one of HARQ-ACK/NACK (Hybrid Automatic Repeat and reQuest Acknowledgement/Negative-ACK) information and RI (Rank Indication) information.

In another aspect of the present invention, in a user equipment for transmitting Uplink Control Information in a wireless communication system, the user equipment includes an RF unit, and a processor configured to add a CRC to the uplink control information, when a bit size of the uplink control information is equal to or greater than a predetermined number, to calculate a number of radio resource elements for transmitting the uplink control information having a CRC added thereto, to perform coding by using a TBCC coding method in accordance with the calculated number of radio resource elements, and to transmit a Physical Uplink Shared Channel signal having the coded uplink control information included therein to a base station, wherein the uplink control information may correspond to any one of HARQ-ACK/NACK (Hybrid Automatic Repeat and reQuest Acknowledgement/Negative-ACK) information and RI (Rank Indication) information.

Preferably, rate matching is performed after applying a block interleaver to the coded uplink control information.

Preferably, a bit size of the CRC is equal to any one of 4 bits, 6 bits, and 8 bits.

Preferably, the predetermined number is equal to any one of 12 bits and 23 bits.

Preferably, the number of radio resource elements is calculated by using a number of subcarriers and a number of symbols of a physical uplink shared channel for an initially transmitted transport block.

Preferably, the number (Q') of radio resource elements is calculated in accordance with an Equation shown below, wherein a number of bits of the uplink control information is equal to O, and wherein a number of bits of the CRC is equal to L.

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right) \quad \langle\text{Equation}\rangle$$

Preferably, when two or more transport blocks are each initially transmitted from a different subframe, the number of radio resource elements is calculated by using a number of subcarriers and a number of symbols of a physical uplink shared channel for each of the initially transmitted subframes.

Preferably, the number (Q') of radio resource elements is calculated in accordance with an Equation shown below, wherein a number of bits of the uplink control information is equal to O, and wherein a number of bits of the CRC is equal to L.

$$Q' = \min\left(\left\lceil \frac{(O+L) \cdot \beta_{offset}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}} \right\rceil, 4 \cdot M_{sc}^{PUSCH}\right) \quad \langle\text{Equation}\rangle$$

Advantageous Effects

According to the embodiments of the present invention, uplink control information may be easily transmitted in a wireless access system, preferably, in a wireless communication system supporting a carrier aggregation environment.

Additionally, according to the embodiments of the present invention, in a wireless communication system supporting a carrier aggregation environment, by using CRC on the uplink control information, and by calculating the number of resource elements required for transmitting the respective uplink control information, the uplink control information may be encoded.

Furthermore, according to the embodiments of the present invention, by applying a block interleaver before rate matching, the transmission performance of the uplink control information may be enhanced.

Additional effects of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are being included as a part of the detailed description of the present invention in order to facilitate the understanding of the present invention, provide exemplary embodiment(s) of the present invention and also describe the technical characteristics of the present invention along with the detailed description of the present invention.

BEST MODE FOR CARRYING OUT THE PRESENT INVENTION

Figure 1:
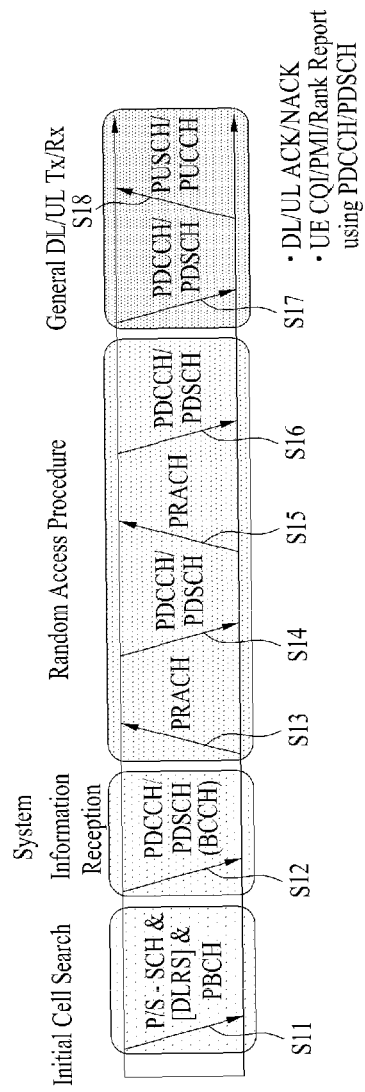
FIG. 1 illustrates physical channels that are used in the 3GPP system and a general method for transmitting signals using such physical channels.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention.

However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Nevertheless, the scope and spirit of the present invention will not be limited only to those of the 3GPP LTE system and the 3GPP LTE-A system.

1. General Description of a 3GPP LTE/LTE-A System to which the Present Invention can be Applied FIG. 1 illustrates physical channels that are used in a 3GPP LTE and a general signal transmitting method using the same.

When a power of a user equipment is turned off and then turned back on, or when a user equipment newly enters (or accesses) a cell, the user equipment performs an initial cell search process, such as synchronizing itself with the base station in step S11. For this, the user equipment may receive a P-SCH (Primary Synchronization Channel) and an S-SCH (Secondary Synchronization Channel) from the base station so as to be in synchronization with the base station, and the user equipment may also acquire information, such as cell ID.

Thereafter, the user equipment may receive a PBCH (Physical Broadcast Channel) so as to acquire broadcast information within the cell. Meanwhile, the user equipment may receive DL RS (Downlink Reference Signal), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S12, so as to acquire more detailed system information.

Thereafter, in order to complete the access to the base station, the user equipment may perform a Random Access Procedure, such as in steps S13 and S16 of a later process, so as to complete the access to the base station. In order to do so, the user equipment transmits a preamble through a PRACH (Physical Random Access Channel) (S13), and then the user equipment may receive a response message respective to the random access through the PDCCH and its respective PDSCH (S14). In case of a contention based random access, the user equipment may perform Contention Resolution Procedures, such as transmitting an additional Physical Random Access Channel (PRACH) signal (S15) and receiving a Physical Downlink Control Channel (PDCCH) signal and a Physical Downlink Shared Channel (PDSCH) signal corresponding to the PDCCH signal (S16).

After performing the above-described procedures, the user equipment may receive a Physical Downlink Control Channel (PDCCH) signal and/or Physical Downlink Shared Channel (PDSCH) signal (S17), as a general uplink/downlink signal transmission procedure, and may then perform PUSCH (Physical Uplink Shared Channel) signal and/or PUCCH (Physical Uplink Control Channel) signal transmission (S18).

The control information being transmitted by the user equipment to the base station is collectively referred to as UCI (Uplink Control Information). The UCI may include HARQ ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and so on.

In the LTE system, the UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2:
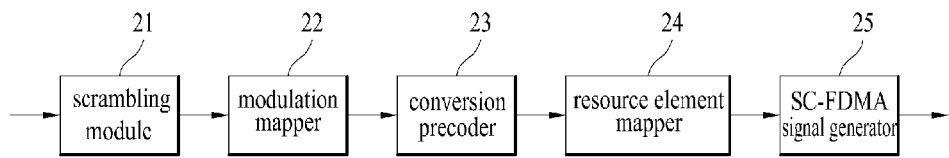
FIG. 2 illustrates a signal processing procedure performed by the user equipment for transmitting uplink signals.

FIG. 2 illustrates a signal processing procedure performed by the user equipment for transmitting uplink signals.

In order to transmit an uplink signal, a scrambling module (21) of the user equipment may scramble a transmission signal by using a user equipment specific scrambling signal. Then, the scrambled signal is inputted to a modulation mapper (22) so as to be modulated to a complex symbol by using a BPSK (Binary Phase Shift Keying) scheme, a QPSK (Quadrature Phase Shift Keying) scheme, or a 16QAM/64QAM (Quadrature Amplitude Modulation) scheme, based upon a type of the transmission signal and/or a channel status. The modulated complex symbol is processed by a conversion precoder (23) and then inputted to a resource element mapper (24). Herein, the resource element mapper (24) may map the complex symbol to a time-frequency resource element. The processed signal may then pass through an SC-FDMA signal generator (25) so as to be transmitted to the base station through an antenna.

Figure 3:
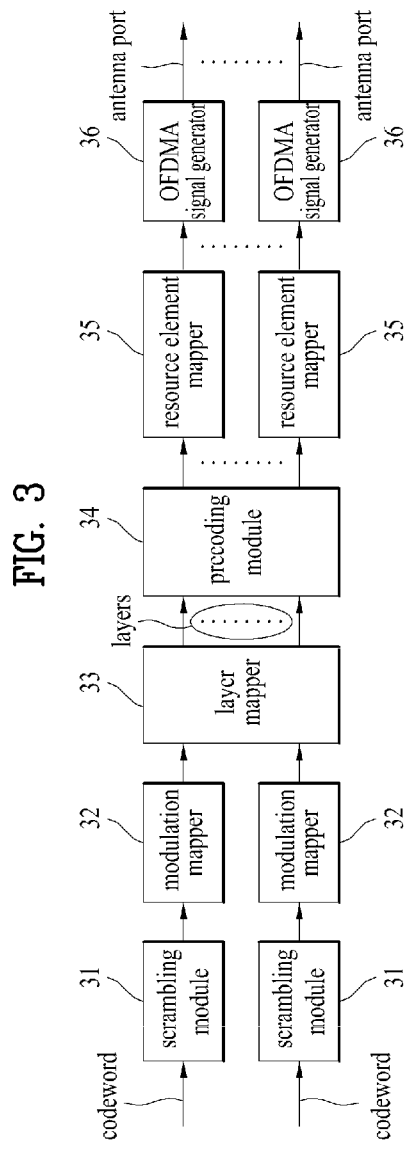
FIG. 3 illustrates a signal processing procedure performed by the base station for transmitting downlink signals.

FIG. 3 illustrates a signal processing procedure performed by the base station for transmitting downlink signals.

In a 3GPP LTE system, a base station may transmit one or more codewords. Accordingly, each of the one or more CWs (codewords) may be processed as a complex symbol by a scrambling module (31) and a modulation mapper (32), just as described in the uplink of FIG. 2. Subsequently, each of the complex symbols may be mapped to a plurality of layers by a layer mapper (33), and each layer may be multiplied by a predetermined precoding matrix by a precoding module (34), thereby being allocated to each transmission antenna. Each of the processed transmission signals respective to an antenna is mapped to a time-frequency resource element by a respective resource element mapper (35). Thereafter, each of the transmission processed signals passes through an OFDM (Orthogonal Frequency Division Multiple Access) signal generator (36) so as to be transmitted through each antenna.

Since the OFDMA scheme uses multiple subcarriers, the OFDMA scheme may be disadvantageous in that a PAPR (Peak-to-Average Ratio) may be relatively greater due to overlapping of the subcarriers. Therefore, as described above in association to FIG. 2 and FIG. 3, in order to compensate for the disadvantage of high PAPR in a user equipment, which is valued for its energy efficiency, in the 3GPP system (e.g., LTE system), the OFDMA scheme is used for downlink signal transmission, and the SC-FDMA (Single Carrier-Frequency Division Multiple Access) scheme is used for uplink signal transmission.

Figure 4:
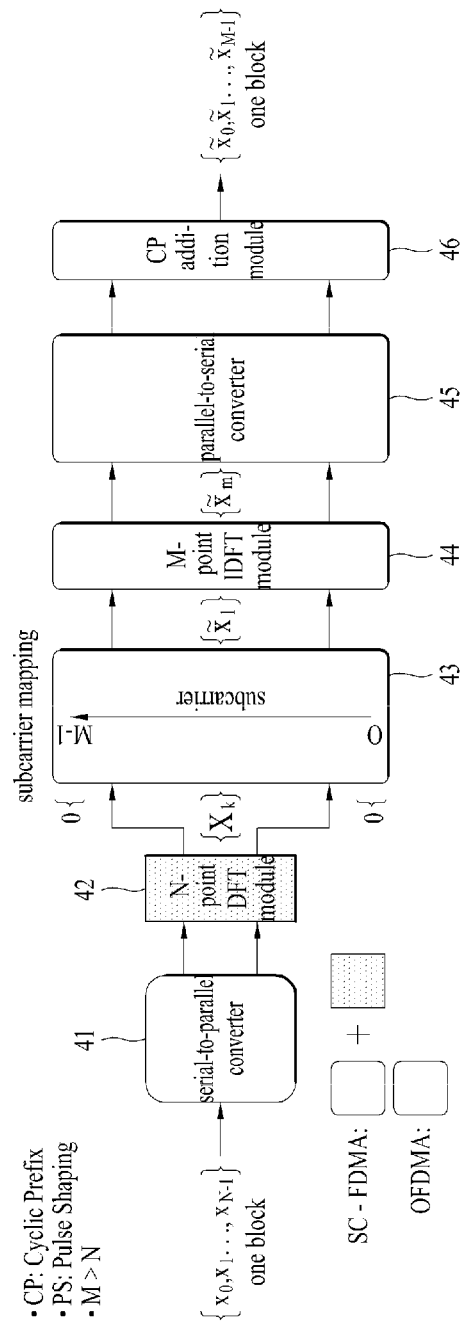
FIG. 4 illustrates a comparison between an SC-FDMA scheme and an OFDMA scheme.

FIG. 4 illustrates a comparison between an SC-FDMA scheme and an OFDMA scheme.

Referring to FIG. 4, a user equipment for uplink signal transmission and a base station for downlink signal transmission are identical to one another in that each of the user equipment and the base station includes a Serial-to-Parallel Converter (41), a subcarrier mapper (43), an M-point IDFT module (44), a Parallel-to-Serial Converter (45), and a CP (Cyclic Prefix) adding module (46).

However, the user equipment for transmitting signals by using the SC-FDMA scheme additionally includes an N-point DFT module (42). N number of data symbols, which are generated through the Serial-to-Parallel Converter (41), are inputted to the N-point DFT module (42). Herein, N number of data symbol elements are dispersed (or spread) throughout the entire allocated band. Subsequently, when it is assumed that a band corresponding to N number of subcarriers is allocated to the user equipment, an output signal of the N-point DFT module (42) is mapped to an allocated location within the entire uplink system band (input of the M-point IDFT module). More specifically, the N-point DFT module (42) is configured to cancel a predetermined portion of an IDFT processing influence caused by the M-point IDFT module (44), so that the transmission signal can have a single carrier property.

Figure 5:
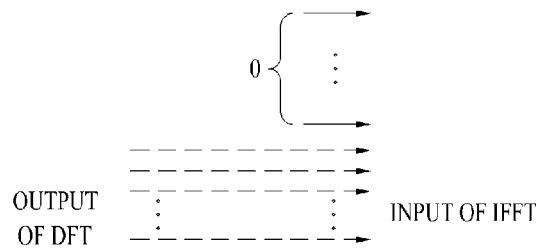
FIG. 5 illustrates a frequency-domain signal mapping method for satisfying a single carrier characteristic within the frequency domain.
Figure 5:
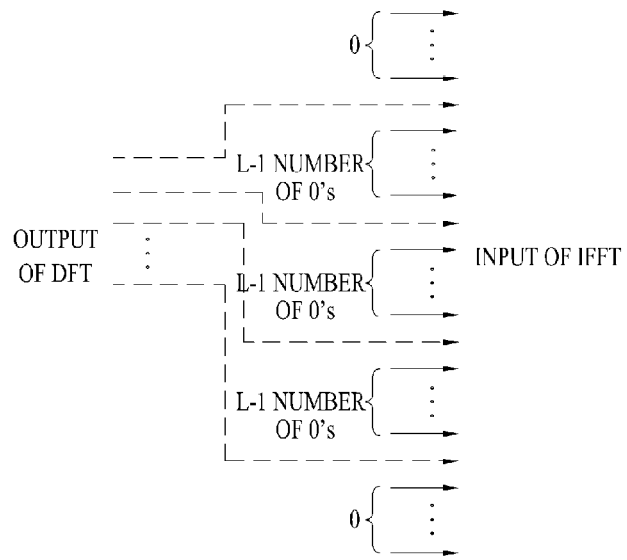

FIG. 5 illustrates a frequency-domain signal mapping method for satisfying a single carrier characteristic within the frequency domain.

FIG. 5(a) represents a localized mapping method, and FIG. 5(b) represents a distributed mapping method. The localized mapping method is defined in the 3GPP LTE system.

Meanwhile, a clustered SC-FDMA, which corresponds to a corrected form of the SC-FDMA, divides DFT process output samples into sub-groups, during the subcarrier mapping process, so that each sub-group can be non-contiguously mapped to a subcarrier region. And, in some cases, the clustered SC-FDMA may include a filtering process and a cyclic extension process. At this point, a sub-group may be referred to as a cluster, and cyclic extension refers to a process of inserting a Guard Interval, which is longer than a maximum Delay Spread of a channel, between contiguous (or consecutive) symbols in order to prevent inter-symbol interference (ISI) while each subcarrier symbol is being transmitted through a multi-path channel.

Figure 6:
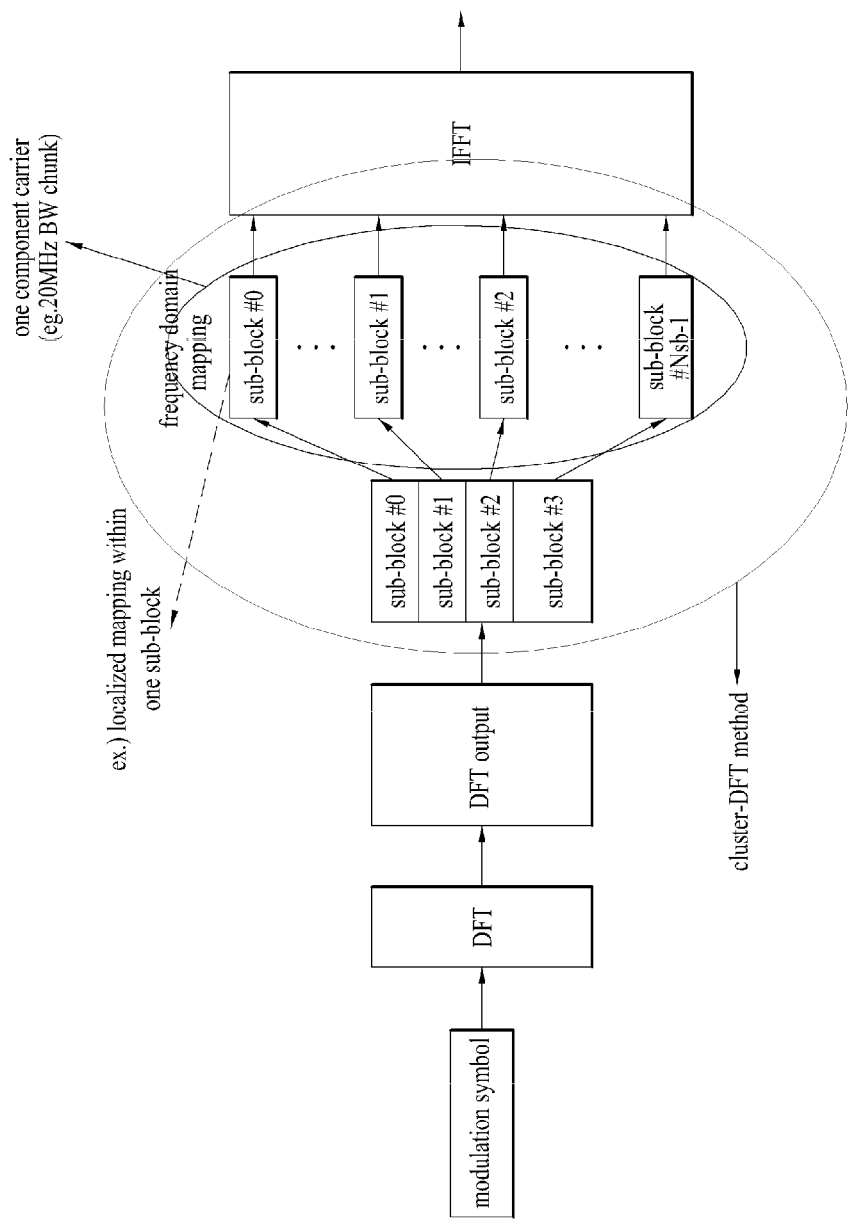
FIG. 6 illustrates a signal processing procedure, wherein DFT process output samples are mapped to a single carrier, in a cluster SC-FDMA.

FIG. 6 illustrates a signal processing procedure, wherein DFT process output samples are mapped to a single carrier, in a cluster SC-FDMA. And, FIG. 7 and FIG. 8 respectively illustrate a signal processing procedure, wherein DFT process output samples are mapped to a multi-carrier, in a cluster SC-FDMA.

Figure 7:
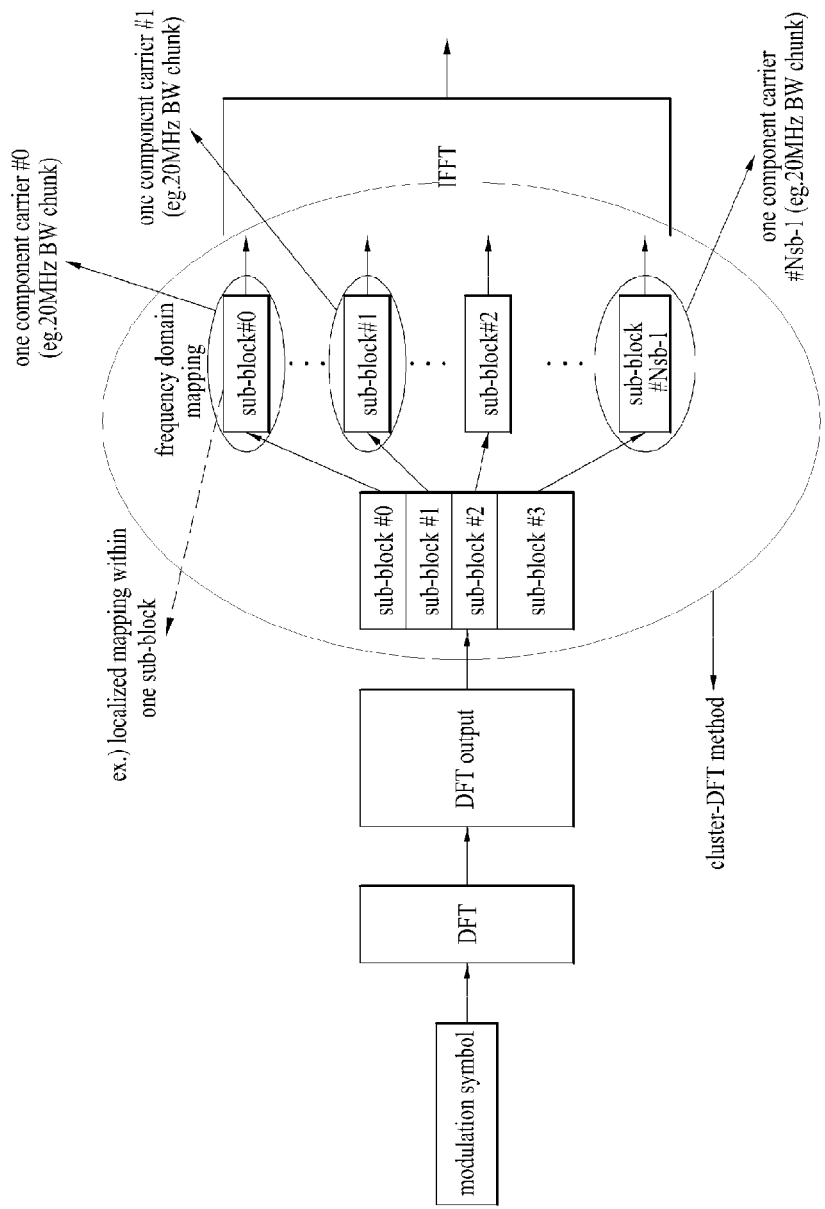
FIG. 7 and FIG. 8 respectively illustrate a signal processing procedure, wherein DFT process output samples are mapped to a multi-carrier, in a cluster SC-FDMA.
Figure 8:
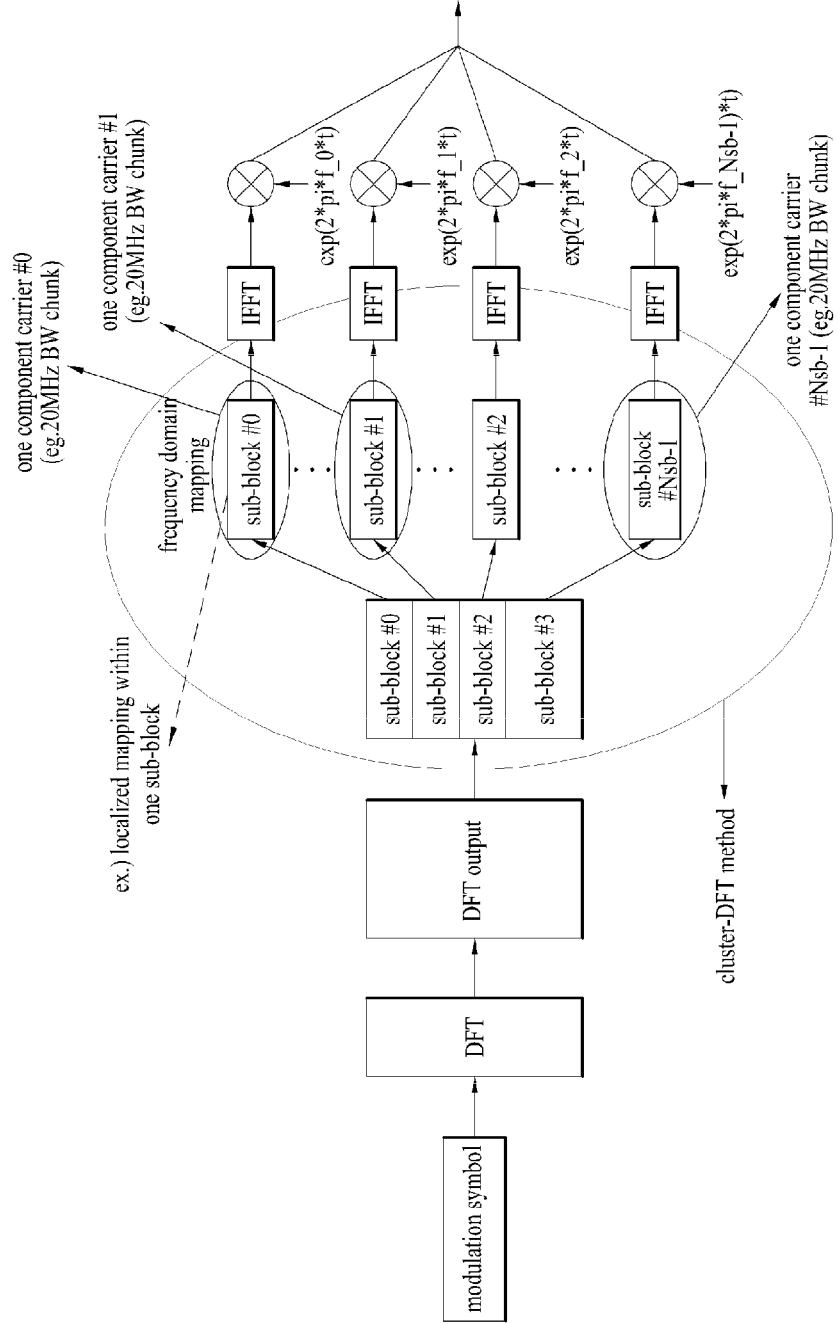

Herein, FIG. 6 corresponds to an example wherein cluster SC-FDMA is applied in an intra-carrier. And, FIG. 7 and FIG. 8 correspond to an example wherein cluster SC-FDMA is applied in an inter-carrier. Also, FIG. 7 represents a case where a signal is generated (or created) through a single IFFT block, when subcarrier spacing between neighboring component carriers is aligned, while contiguous component carriers are allocated in a frequency domain. And, FIG. 8 represents a case where a signal is generated through multiple IFFT blocks, since component carriers are not adjacent to one another, while component carriers are non-contiguously allocated in the frequency domain.

Segmented SC-FDMA refers to simply performing DFT spreading of the conventional SC-FDMA and extending a frequency subcarrier mapping configuration of the IFFT in accordance with a relation between the DFT and the IFFT having a one-to-one correspondence, when a number of IFFTs equal to a random number of DFTs is being applied. Herein, the segmented SC-FDMA will also be referred to as NxSC-FDMA or NxDFT-s-OFDMA and will, hereinafter, be collectively referred to as segmented SC-FDMA for simplicity.

Figure 9:
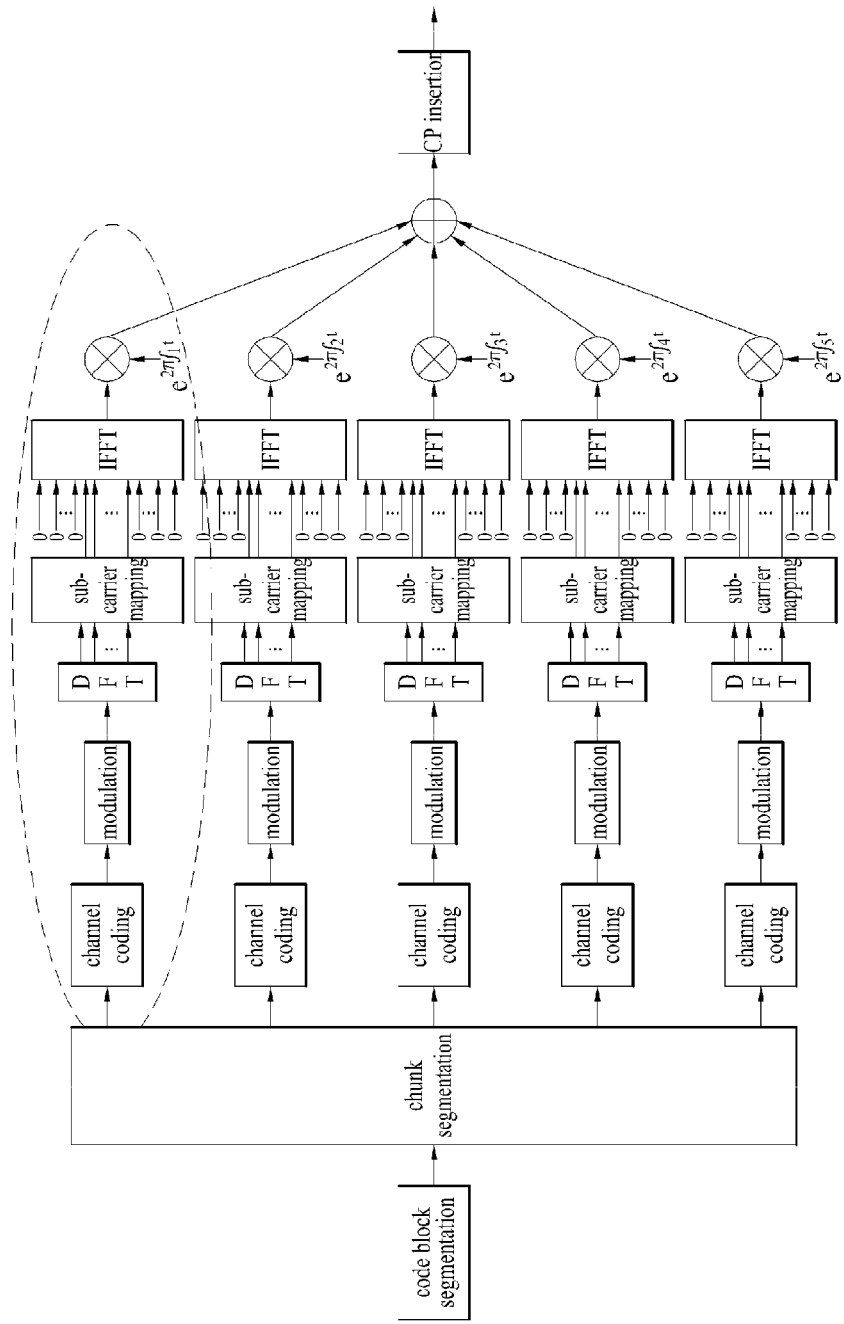
FIG. 9 illustrates a signal processing procedure in a segment SC-FDMA system.

FIG. 9 illustrates a signal processing procedure in a segment SC-FDMA system.

Referring to FIG. 9, the segmented SC-FDMA process refers to a process of grouping the entire time domain modulation symbols to N number of groups (wherein N is an integer greater than 1) and performing a DFT process in group units, in order to alleviate the single carrier property condition (or specification).

Figure 10:
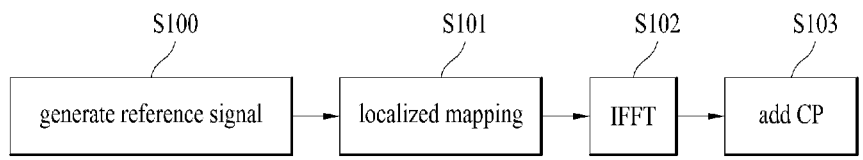
FIG. 10 illustrates a signal processing procedure for transmitting a reference signal via uplink.

FIG. 10 illustrates a signal processing procedure for transmitting a reference signal (hereinafter referred to as "RS".) via uplink. In the data portion, a signal is generated from the time domain and mapped to a frequency domain through a DFT precoder, thereby being transmitted through the IFFT. Conversely, a process of having an RS pass through the DFT precoder is omitted. The RS is directly generated in the frequency domain (S100) and is then transmitted after being sequentially processed with localized mapping (S101), an IFFT process (S102), and a Cyclic Prefix (CP) adding process (S103).

Figure 11:
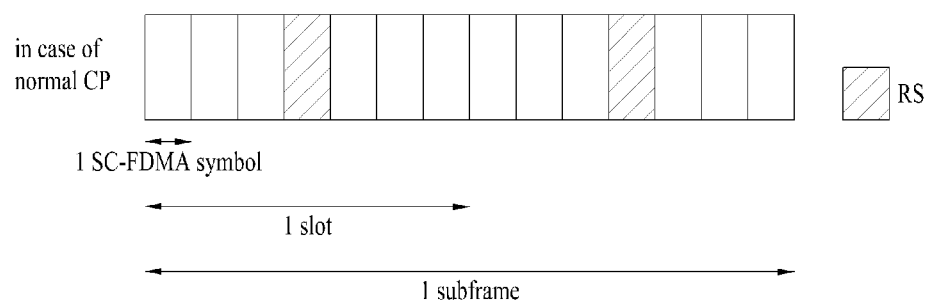
FIG. 11 illustrates a subframe structure for transmitting an RS in case of a normal cyclic prefix (CP).
Figure 12:
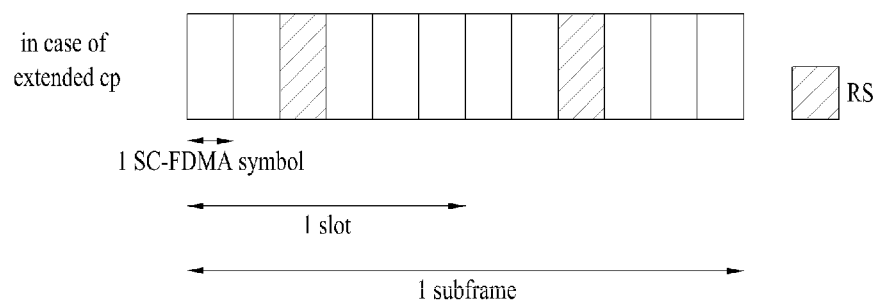
FIG. 12 illustrates a subframe structure for transmitting an RS in case of an extended cyclic prefix (CP).

FIG. 11 illustrates a subframe structure for transmitting an RS in case of a normal cyclic prefix (CP). And, FIG. 12 illustrates a subframe structure for transmitting an RS in case of an extended cyclic prefix (CP). Referring to FIG. 11, in the normal cyclic prefix (CP), the RS is transmitted through $4^{th}$ and $11^{th}$ SC-FDMA symbols, and, referring to FIG. 12, in the extended cyclic prefix (CP), the RS is transmitted through $3^{rd}$ and $9^{th}$ SC-FDMA symbols.

2. UL-SCH (Uplink Shared Channel) Signal Transmission

A UCI that is to be transmitted by the user equipment mostly refers to ACK/NACK, CQI, RI information, which are required for downlink packet data transmission and is generally transmitted through a PUCCH. The PUCCH generally performs transmits by using a frequency resource located at each end of a system management frequency band. However, when the user equipment transmits packet data, a method for transmitting control information through the allocated frequency resource cannot be used. This is because, when a PUSCH and a PUCCH are simultaneously transmitted to the same transport (or transmission) section, the single carrier characteristic cannot be satisfied, thereby causing the PAPR of the user equipment to be increased. Therefore, in the current LTE system, in a transport (or transmission) section to which the user equipment transmits packet data, a control channel may be transmitted by using the frequency resource of the data channel.

Meanwhile, in order to transmit a transport channel and control information, a channel encoding procedure for overcoming any error that may occur in a physical channel, a CRC (Cyclic Redundancy Check) adding procedure for measuring errors, a rate matching procedure for matching transport (or transmission) bit numbers of the physical channel, and so on, are performed. Hereinafter, such procedures will be described in detail.

2. 1. General Introduction of a UL-SCH Signal Processing Procedure

Figure 13:
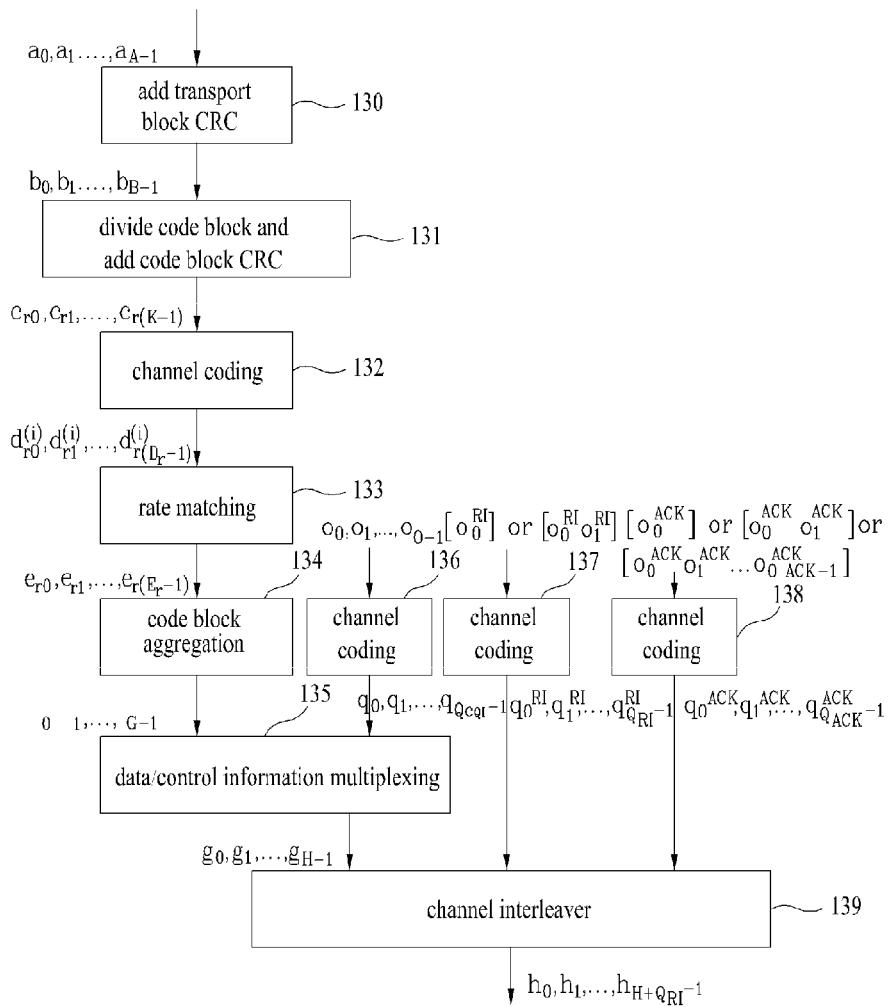
FIG. 13 illustrates a signal processing procedure of an uplink shared channel, which corresponds to a transmission channel.

FIG. 13 illustrates a signal processing procedure of an uplink shared channel (hereinafter referred to as "UL-SCH"), which corresponds to a transmission channel. Hereinafter, the signal processing procedure of the UL-SCH may be applied to one or more transmission channels or control information types.

Referring to FIG. 13, the UL-SCH delivers data to an encoding unit (conding unit) once at each TTI (time transmission interval) in the form of a TB (Transport Block).

A CRC parity bit $p_0, p_1, p_2, p_3, \ldots, p_{L-1}$ is added to bits $a_0, a_1, a_2, a_3, \ldots, a_{A-1}$ of the transport block, which is delivered from a higher layer (S130). At this point, A represents the size of the transport block, and L represents the number of parity bits. The input bits having the CRC added thereto correspond to $b_0, b_1, b_2, b_3, \ldots, b_{B-1}$. At this point, B represents the number of bits of the transport block including the CRC.

$b_0, b_1, b_2, b_3, \ldots, b_{B-1}$ are processed with segmentation (or $b_0, b_1, b_2, b_3, \ldots, b_{B-1}$ is segmented to a plurality of CBs (Code blocks) in accordance with the TB size, and the CRC is added to the plurality of the segmented CBs (S131). After performing code block segmentation and CRC adding, the CRCs correspond to $c_{r0}, c_{r1}, c_{r2}, c_{r3}, \ldots, c_{r(K_r-1)}$. Herein, r corresponds to a code block number (r=0, ..., C−1), and Kr corresponds to the number of bits respective to the code block r. Additionally, C represents a total number of code blocks.

Subsequently, channel coding is performed (S132). After performing channel coding, the output bits correspond to $d_{r0}^{(i)}, d_{r1}^{(i)}, d_{r2}^{(i)}, d_{r3}^{(i)}, \ldots, d_{r(D_r-1)}^{(i)}$. At this point, i corresponds to a coded stream index and may have a value of 0, 1, or 2. $D_r$ represents a number of bits of an $i^{th}$ coded stream for code block r. r corresponds to a code block number (r=0, ..., C−1), and C represents a total number of code blocks. Each code block may be coded by turbo coding.

Thereafter, Rate Matching is performed (S133). After being processed with rate matching, the processed bits correspond to $e_{r0}, e_{r1}, e_{r2}, e_{r3}, \ldots, e_{r(E_r-1)}$. At this point, r corresponds to a code block number (r=0, ..., C−1), and C represents a total number of code blocks. $E_r$ represents a number of rate matched bits of an $r^{th}$ code block.

Afterwards, concatenation between code blocks is performed once again (S134). The bits of the concatenated code blocks correspond to $f_0, f_1, f_2, f_3, \ldots, f_{G-1}$. At this point, G represents a total number of bits, which are coded for transmission, and, when the control information is multiplexed with UL-SCH transmission, the number of bits that are used for the transmission of the control information is not included herein.

Meanwhile, when the control information is transmitted from the PUSCH, CQI/PMI, RI, ACK/NACK, which correspond to the control information, may each be independently processed with channel coding (S136, S137, S138). Since different coded symbols are allocated for transmitting each type of control information, each type of control information may have a different coding rate.

In a TDD (Time Division Duplex), an ACK/NACK feedback mode supports two different modes, ACK/NACK bundling and ACK/NACK multiplexing, based upon higher layer settings. For the ACK/NACK bundling, an ACK/NACK information bit is configured of 1 bit or 2 bits, and, for the ACK/NACK multiplexing, an ACK/NACK information bit is configured of 1 bit to 4 bits.

In step S134, after the concatenation step between the code blocks, multiplexing of the coded bits $f_0, f_1, f_2, f_3, \ldots, f_{G-1}$ of the UL-SCH data and the coded bits $q_0, q_1, q_2, q_3, \ldots, q_{N_L \cdot Q_{CQI}-1}$ of the CQI/PMI is performed (S135). The multiplexed result of the data and the CQI/PMI corresponds to $g_0, g_1, g_2, g_3, \ldots, g_{H'-1}$. At this point, $g_i$ (i=0, ..., H'−1) represents a column vector having a length of $(Q_m \cdot N_L)$. $H=(G+N_L \cdot Q_{CQI})$, and $H'=H/(N_L \cdot Q_m)$. $N_L$ represents a number of layers having a UL-SCH transport block mapped thereto, and H represents a total number of coded bits being allocated to the $N_L$ number of transport (or transmission) layers, to which transport blocks are mapped thereto for the UL-SCH data and the CQI/PMI information.

Subsequently, the multiplexed data and CQI/PMI, the separately channel coded RI, and ACK/NACK are channel interleaved, thereby generating an output signal (S139).

2. 2. Resource Element Mapping

Hereinafter, the mapping of the data and Resource Elements (hereinafter referred to as RE) for the control channel will be described in detail.

Figure 14:
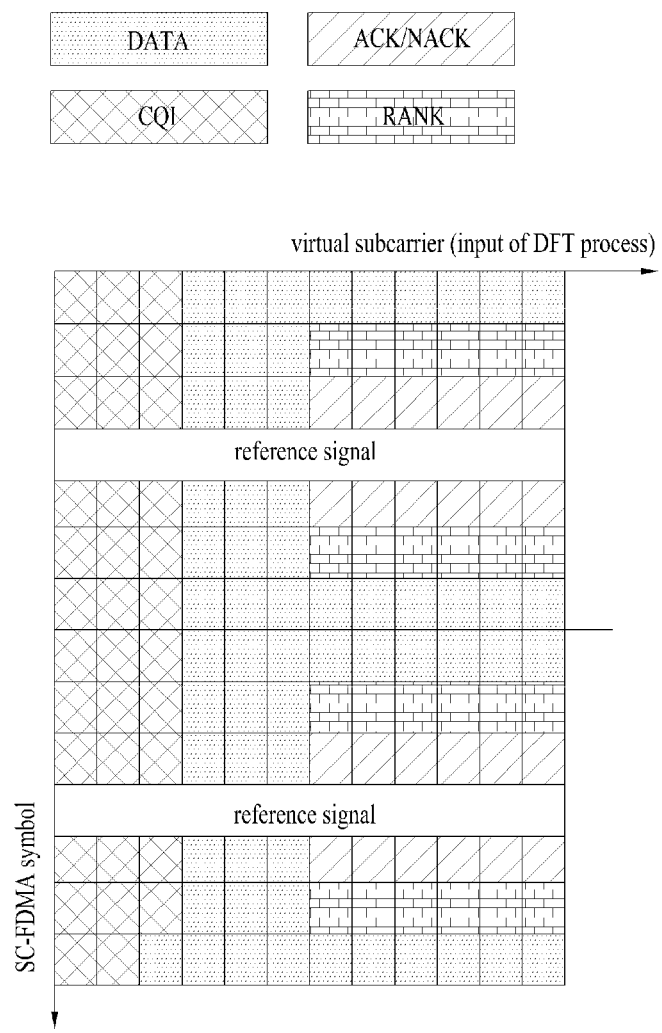
FIG. 14 illustrates a mapping method of a physical resource for uplink data and control channels.

FIG. 14 illustrates a mapping method of a physical resource for uplink data and control channels.

Referring to FIG. 14, the CQI/PMI and the data are mapped on an RE in a time-first method. The CQI and the data are multiplexed by using a serial concatenation method. The coded ACK/NACK is adjacent to a DM RS (Demodulation Reference Signal) and punctured, thereby being inserted. The ACK/NACK is punctured and inserted starting from the lowest subcarrier of a virtual subcarrier, and the ACK/NACK is punctured while reducing (deleting or removing) CQI resources. The RI is processed with rate matching regardless of the ACK/NACK transmission, and the RI is mapped to a position that is adjacent to the RE having the ACK/NACK inserted therein. Resources for the RI and the ACK/NACK may occupy a maximum of 4 SC-FDMA symbols.

In case data and control information are simultaneously transmitted to a UCI, the mapping order may correspond to an order of the RI, a concatenation of the CQI/PMI and the data, and the ACK/NACK. More specifically, the RI is first mapped, and then the concatenation of the CQI/PMI and the data are mapped to the remaining REs, excluding the RE having the RI mapped thereto, by using the time-first method. The ACK/NACK is mapped by puncturing the concatenation of the CQI/PMI and the data, which are already mapped to the respective REs.

As described above, by multiplexing the data and uplink control information (UCI), such as the CQI/PMI and so on, the single carrier property may be satisfied. Therefore, an uplink transmission maintaining a low CM (Cubic Metric) may be achieved.

In an enhanced system of the conventional system (e.g., LTE Rel-10), with respect to each user equipment, among the two transmission methods of the SC-FDMA and the cluster DFTs OFDMA within each carrier component, at least one transmission method may be applied for uplink transmission. And, the applied transmission method may be applied along with a UL-MIMO (Uplink-MIMO) transmission.

2. 3. UL-SCH Signal Transmission in a Multiple Input Multiple Output (MIMO) System In the conventional system (e.g., LTE Rel-8), the user equipment docs not simultaneously use multiple transmission antennae. However, in an enhanced version of the conventional system (e.g., LTE Rel-10), an MIMO technique using a maximum of 4 transmission antennae may be applied. Hereinafter, the UL-SCH signal transmission in the MIMO system will be described in detail.

2. 3. 1. General UL-SCH Signal Processing Procedure in the MIMO System

Figure 15:
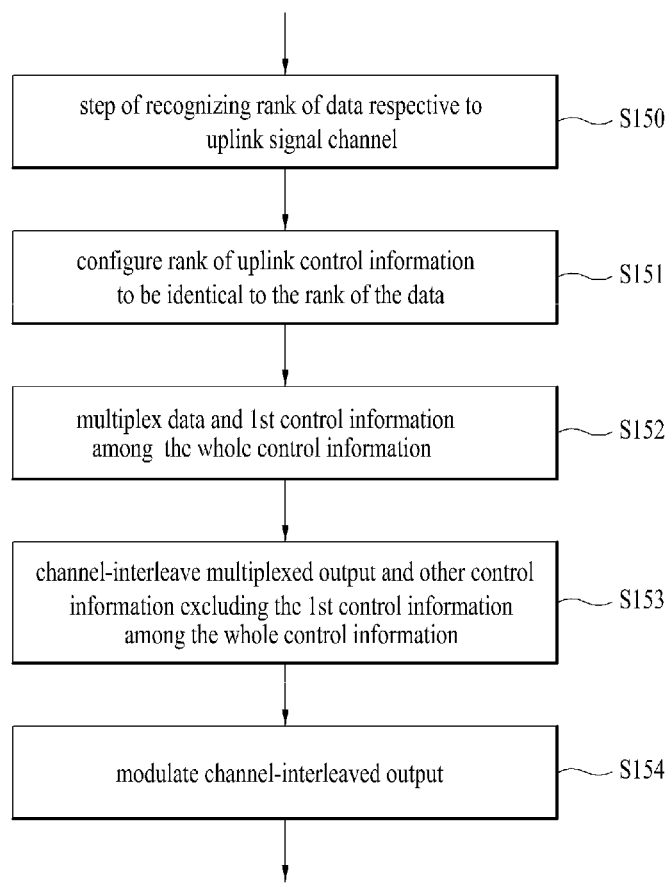
FIG. 15 illustrates a flow chart showing a method for efficiently multiplexing data and control channels within an uplink shared channel.

FIG. 15 illustrates a flow chart showing a method for efficiently multiplexing data and control channels within an uplink shared channel.

As shown in FIG. 15, the user equipment recognizes a rank respective to data of a UL-SCH (S150). Then, the user equipment configures a rank of an uplink control channel (herein, a control channel refers to a UCI, such as CQI, ACK/NACK, RI, and so on) to be identical to the rank of the data (S151). Also, the user equipment multiplexes data and control information (S152). Subsequently, channel interleaving may be performed in order to assist in (or aid) mapping the data and the CQI by using a time-first method, mapping the RI to a designated RE, and mapping the ACK/NACK by puncturing the REs surrounding the DM-RS (S153).

Thereafter, the data and the control channel may be modulated to QPSK, 16QAM, 64QAM, and so on in accordance with an MCS table (S154). At this point, the step of modulating the data and the control channel may be performed in another process step. For example, the corresponding process step may be performed before step S152, wherein the data and the control channel are multiplexed.

Furthermore, channel interleaving may either be performed in codeword units or be performed in layer units.

Figure 16:
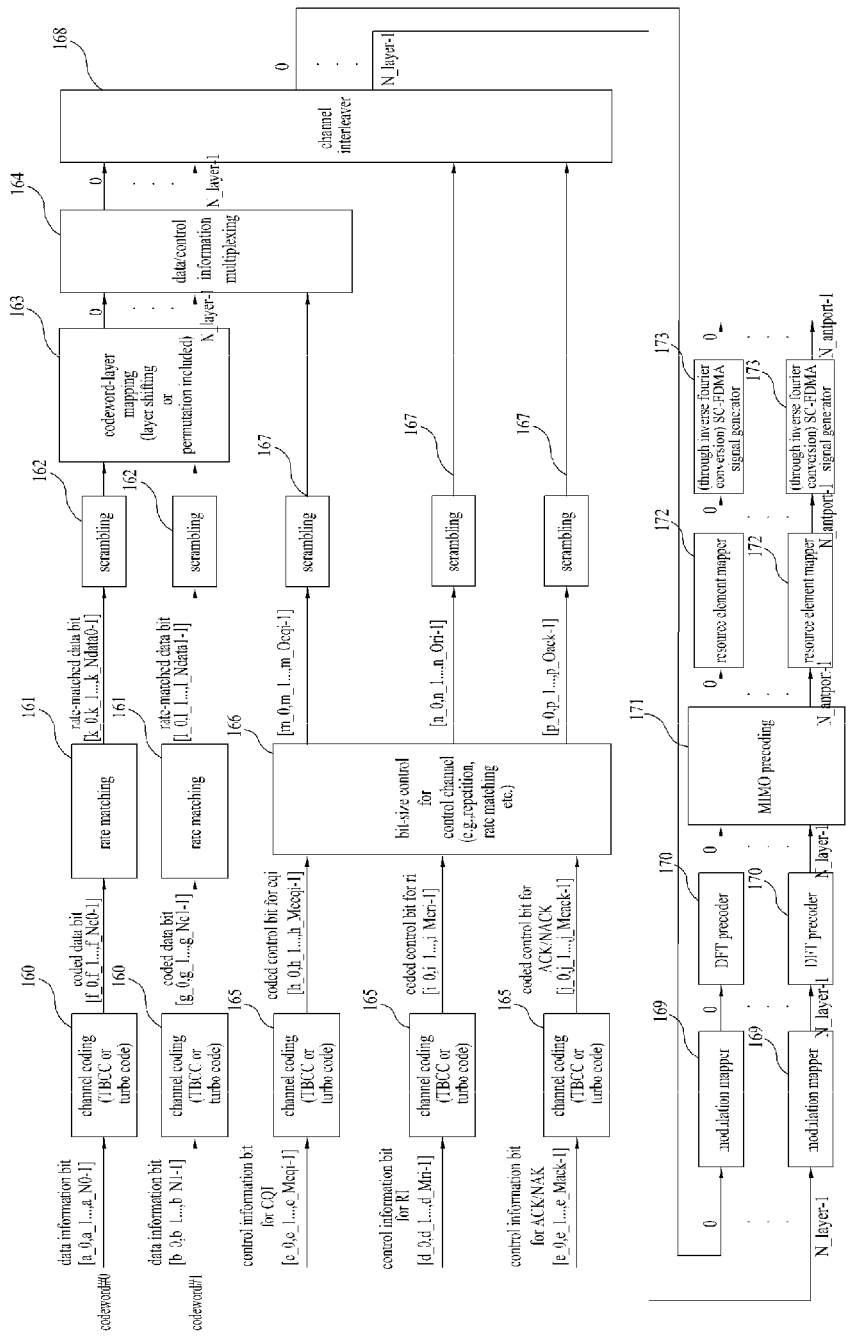
FIG. 16 illustrates a block view showing a method of generating transmission signals of data and control channels.

FIG. 16 illustrates a block view showing a method of generating transmission signals of data and control channels.

When it is assumed that there are two codewords, channel coding is performed on each codeword (160), and rate matching is performed based upon a given MCS level and resource size (161). Thereafter, coded bits may be scrambled by using a cell-specific method, a UE-specific method or a codeword-specific method (162).

Subsequently, a codeword to layer mapping is performed (163). During this process, operations of a layer shift or permutation may be included.

Figure 17:
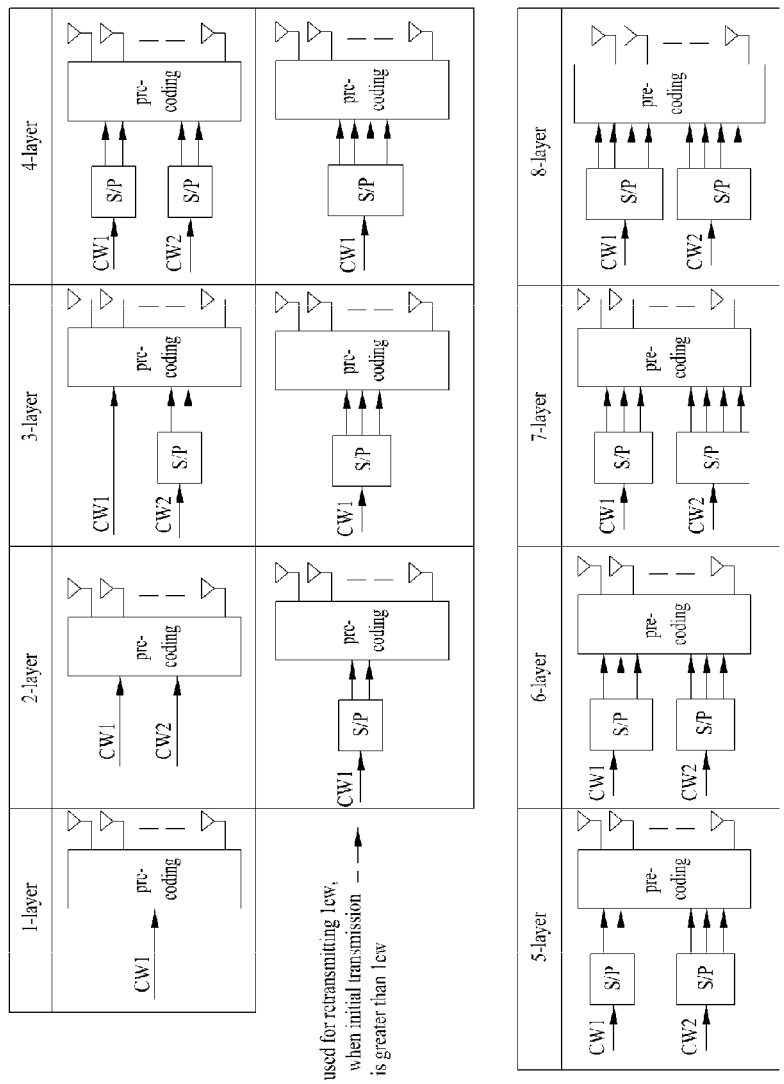
FIG. 17 illustrates a codeword to layer mapping method.

FIG. 17 illustrates a codeword to layer mapping method. The codeword to layer mapping may be performed by using the rule shown in FIG. 17. The precoding position shown in FIG. 17 may be different from the precoding position shown in FIG. 13.

Referring back to FIG. 16, control information, such as CQI, RI, and ACK/NACK, is channel coded based upon a given specification (165). At this point, the CQI, the RI, and the ACK/NACK may be coded by using the same channel code for all codewords or may be coded by using different channel codes for each codeword.

Thereafter, a number of coded bits may be varied by a bit-size controller (166). The bit-size controller may form a single body with the channel coding block (165). A signal outputted from the bit-size controller is scrambled (167). At this point, scrambling may be performed to be cell-specific, layer-specific, codeword-specific, or UE-specific.

The bit-size controller may perform the following operations.

(1) The controller recognizes a rank of data respective to PUSCH (n_rank_pusch).

(2) A rank of the control channel (n_rank_control) is configured to be identical as the rank of the data (i.e., n_rank_control=n_rank_pusch), and a number of bits respective to the control channel is multiplied by the control channel rank, thereby extending the number of bits.

One of the methods of performing the above-described operation is to simply duplicate and repeat the control channel. At this point, the control channel may either correspond to an information level prior to being processed with channel coding or correspond to a coded bit level after being processed with channel coding. More specifically, for example, in case of a control channel [a0, a1, a2, a3] having n_bit_crtl=4, and when n_rank_pusch=2, a number of extended bits (n_ext_crtl) may become 8 bits [a0, a1, a2, a3, a0, a1, a2, a3].

As another method, a circular buffer method may also be applied, so that the number of extended bits (n_ext_crtl), as described above, can be equal to 8 bits.

As described above, by limiting the rank of the control channel to be identical to the rank of the data channel, signaling overhead may be reduced. This is because, when the rank of the control channel and the rank of the data channel are different from one another, in order to identically precode the uplink DM-RS and the data, a control channel for PMI signaling may be additionally required. Therefore, this method is advantageous in that the same RIs respective to the data channel and the control channel may simplify the multiplexing procedure and also that the need for additional signaling can be eliminated. Additionally, even when only one rank of an effective control channel exists, the transmission (or transport) rank of the control channel may be identical to the rank (n_rank_pusch) of the data may be identical to one another. In the transmitting end, after applying the MIMO decoder to each layer, each LLR output may be accumulated as an MRC (Maximum Ratio Combining) means.

Meanwhile, in case the bit-size controller and the channel coding unit are configured as a single body, the coded bits may be generated by adopting channel coding and rate matching, which are defined in the conventional system (e.g., LTE Rel-8).

Additionally, in order to further provide randomization for each layer, a bit level interleaving process may be performed in the bit-size controller. Alternatively, as an equivalent of the above, an interleaving process may also be performed at a modulation symbol level.

A CQI/PMI channel and data respective to 2 codewords may be multiplexed by a data/control multiplexer (164). Then, by having the ACK/NACK information be mapped to REs surrounding the uplink DM-RS, in each slot within a subframe, the channel interleaver maps the CQI/PMI in accordance with a time-first mapping method (168).

Then, modulation is performed for each layer (169), and DFT precoding (170), MIMO precoding (171), RE mapping (172), and so on, are sequentially performed. Thereafter, an SC-FDMA signal is generated and transmitted through an antenna port (173).

The above-described function blocks are not limited to the positions shown in FIG. 16. And, in some cases, the corresponding positioned may be changed. For example, the scrambling blocks (162, 167) may be positioned after the channel interleaving block. Also, the codeword to layer mapping block (163) may be positioned after the channel interleaving block (168) or after the modulation mapper block (169).

2. 3. 2. Resource Element Mapping in the MIMO System

Figure 18:
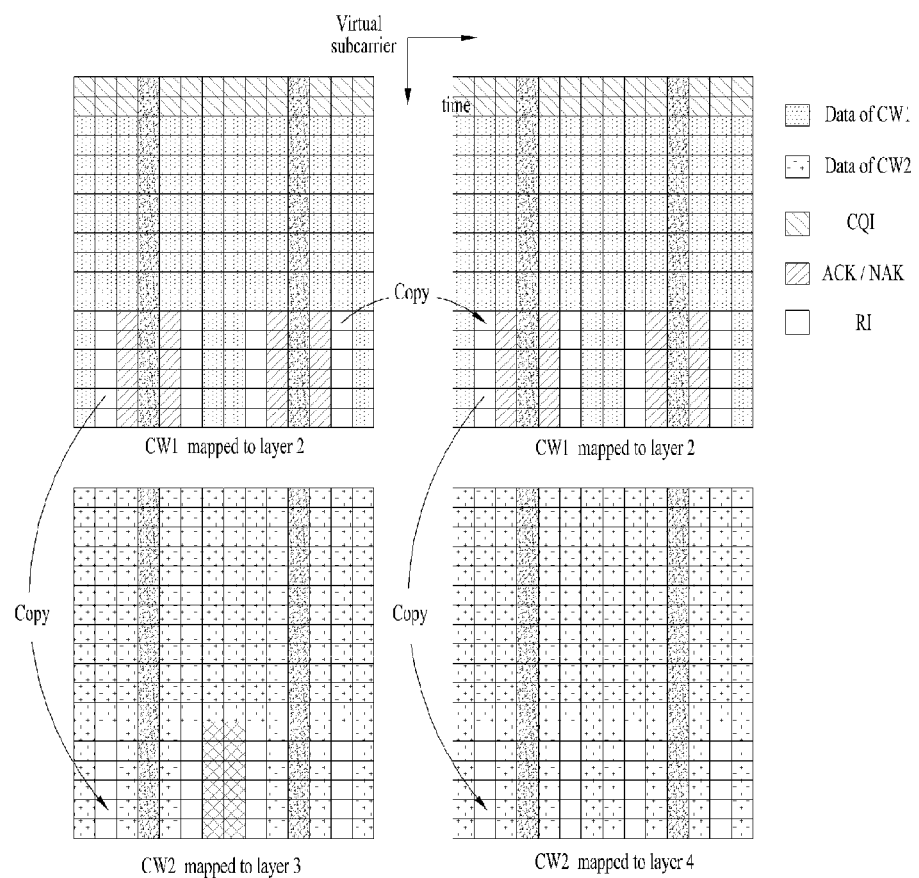
FIG. 18 illustrates an exemplary mapping between uplink data and physical resource elements for control channel transmission in case of using 2 codewords and 4 layers.

FIG. 18 illustrates an exemplary mapping between uplink data and physical resource elements for control channel transmission in case of using 2 codewords and 4 layers.

The CQI is concatenated with the data and is mapped to the remaining REs, excluding the RE having the RI mapped thereto, by using the time-first mapping method and by using the same modulation order and constellation point as the data. In case of the SU-MIMO, the CQI is transmitted by being dispersed to one codeword. For example, among the two codewords, the codeword to which the CQI is transmitted corresponds to the codeword having a higher MCS level, and, in case the MCS levels of the two codewords are the same, the CQI is transmitted to codeword 0.

Additionally, the ACK/NACK is positioned by puncturing a concatenation of the CQI and data, which are already mapped to symbols located at each side of a reference signal. And, since the reference signal is positioned in $3^{rd}$ and $10^{th}$ symbols, the mapping process is performed by starting from the lowermost subcarrier of $2^{nd}$, $4^{th}$, $9^{th}$, and $11^{th}$ symbols and proceeding upwards. At this point, the ACK/NACK symbol is mapped by an order the symbols 2, 11, 9, 4.

The RI is mapped to a symbol positioned next to the ACK/NACK and is mapped earlier than any other information (data, CQI, ACK/NACK) being transmitted to the PUSCH. More specifically, mapping of the RI is performed by starting from the lowermost subcarrier of $1^{st}$, $5^{th}$, $8^{th}$, and $12^{th}$ symbols and proceeding upwards. At this point, the RI symbol is mapped by an order of the $1^{st}$, $12^{th}$, $8^{th}$, $5^{th}$ symbols.

Most particularly, in case the information bit size is equal to 1 bit or 2 bits, the ACK/NACK and the RI are mapped by using only four corners of the constellation and by using the QPSK method. And, in case the information bit size is equal to or larger than 3 bits, the ACK/NACK and the RI may be mapped by using all constellations of the modulation order identical to that of the data. Furthermore, the ACK/NACK and the RI uses the same resources corresponding to the same position within each layer so as to transmit the same information.

2. 4. Resource Elements for UCI

When transmitting a UCI using a PUCCH, information bits are channel coded, and the number of bits that are to be actually transmitted (or transported) to the PUCCH is fixed for each UCI type. Additionally, by increasing or decreasing the transmission power, the reception quality may be maintained to a wanted target level. However, when the UCI is transmitted from the PUSCH region along with the data, the transmission power should be set up identically as the data. In this case, when the data has a high Spectral Efficiency or a high MCS, the received SNR (Signal to noise ratio) for each symbol becomes high, and, when the data uses a low Spectral Efficiency or a low MCS, the SNR becomes low. In this case, in order to maintain the reception quality of the UCI, the number of transmission symbols (or transport symbols) of the UCI is required to be changed (or varied) based upon the data. In order to do so, the LTE system varies (or changes) the number of symbols required for the UCI transmission in accordance with the spectral efficiency data, which are transmitted to the PUSCH.

Hereinafter, although the description is made based upon an SU-MIMO environment, the following description may also be applied to a single antenna transmission, which may correspond to a particular case of the SU-MIMO.

2. 4. 1. Number of Resource Elements Used in Case of CQI (or PMI)

When the user equipment transmits CQI (or PMI) information bits over the PUSCH, the number of resource elements for CQI (or PMI) per layer may be calculated in accordance with Equation 1 shown below. Herein, the number of resource elements for CQI (or PMI) may be expressed as a number ($Q'$) of coded modulation symbols. Hereinafter, although the following description is given under the assumption of CQI, the same description may also be equally applied to PMI.

[Equation 1]

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(x)}-1} K_r^{(x)}} \right\rceil, M_{sc}^{PUSCH} \cdot M_{symb}^{PUSCH} - \frac{Q_{RI}}{Q_m}\right)$$

Herein, O represents the number of bits of the CQI. L represents the number of CRC bits, and L has a value of 0, when O is less than or equal to 11 bits, and L has the value of 8 in all other cases. More specifically, $$L = \begin{cases} 0 & O \le 11 \\ 8 & \text{otherwise.} \end{cases}$$

$\beta_{offset}^{CQI}$ is decided in accordance with the number of transmission (or transport) codewords respective to the transport block, and a parameter for setting up (or determining) an offset value for considering a difference in SNR between the data and the UCI is decided as $\beta_{offset}^{PUSCH} = \beta_{offset}^{CQI}$. $M_{sc}^{PUSCH}$ indicates a bandwidth, which is allocated (scheduled) for the PUSCH transmission within a current subframe for the transport block, as a subcarrier. $N_{symb}^{PUSCH}$ indicates the number of SC-FDMA symbols within the subframe, to which the current PUSCH is transmitted, and may be calculated by using Equation 2 shown below.

$N_{symb}^{PUSCH} = (2(N_{symb}^{UL}-1)-N_{SRS})$ [Equation 2]

Herein, when the user equipment transmits a PUSCH and an SRS (Sounding Reference Signal) within the same subframe, or when the PUSCH resource allocation for an initial transmission (or transport) overlaps, even partially, with the subframe and frequency bandwidth of a cell-specific SRS, $N_{SRS}$ may be set to have a value of 1, and in other cases $N_{SRS}$ may be set to have a value of 0.

$N_{symb}^{PUSCH-initial}$ represents a number of SC-FDMA symbols per initial PUSCH transmission subframe for the same transport block as described above, and $M_{sc}^{PUSCH-initial}$ represents the number of subcarriers. In $K_r^{(x)}$, x indicates an index of a transport block having the highest MCS, which is designated by an uplink grant.

$M_{sc}^{PUSCH-initial}$, C, and $K_r^{(x)}$ may be obtained from an initial PDCCH for the same transport block as described above. In case $M_{sc}^{PUSCH-initial}$, C, and $K_r^{(x)}$ are not included in the initial PDCCH (DCI format 0), the corresponding values may be decided by using another method. More specifically, when the initial PUSCH for the same transport block as described above is processed with semi-persistent scheduling, and when the PUSCH has most recently been initialized by the PDCCH, which has directed the semi-persistent scheduling, or by a random access response grant, $M_{sc}^{PUSCH-initial}$, C, and $K_r^{(x)}$ may be decided by a random access response grant for the sane transport block as described above.

Data information (G) of the UL-SCH corresponds to Equation 3 shown below.

$G = N_{symb}^{PUSCH} \cdot M_{sc}^{PUSCH} \cdot Q_m - Q_{CQI} - Q_{RI}$ [Equation 3]

As described above, once the number of resource elements for the CQI is obtained, the number of bits after performing channel coding of the CQI may be obtained based upon the modulation method (or scheme). $Q_{CQI}$ represents a total number of coded bits of the CQI and may correspond to $Q_{CQI} = Q_m \cdot Q'$. Herein, $Q_m$ corresponds to a number of bits per symbol with respect to the modulation order, and, in case of QPSK, $Q_m$ is equal to 2, in case of 16QAM, $Q_m$ is equal to 4, and in case of 64QAM, $Q_m$ is equal to 6. Since the resources for the RI are allocated at a higher priority level, the number of resource elements allocated to the RI may be excluded. When the RI is not transmitted, $Q_{RI}=0$.

2. 4. 2. Number of Resource Elements Used in Case of ACK/NCK (or RI)

When the user equipment transmits ACK/NACK (or RI) information bits over the PUSCH, the number of resource elements for ACK/NACK (or RI) per layer may be calculated in accordance with Equation 4 shown below. Herein, the number of resource elements for ACK/NACK (or RI) may be expressed as a number (Q') of coded modulation symbols.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}}\right\rceil, 4 \cdot M_{sc}^{PUSCH}\right)$$ [Equation 4]

Herein, O represents the number of bits of the ACK/NACK (or RI).

$\beta_{offset}^{HARQ-ACK}$, $\beta_{offset}^{RI}$ are each decided in accordance with the number of transmission (or transport) codewords respective to the transport block. And, a parameter for setting up (or determining) an offset value for considering a difference in SNR between the data and the UCI is each decided as $\beta_{offset}^{PUSCH} = \beta_{offset}^{HARQ-ACK}$, $\beta_{offset}^{PUSCH} = \beta_{offset}^{RI}$.

$M_{sc}^{PUSCH}$ indicates a bandwidth, which is allocated (scheduled) for the PUSCH transmission within a current subframe for the transport block, as a subcarrier.

$N_{symb}^{PUSCH-initial}$ indicates the number of SC-FDMA symbols for each initial PUSCH transmission subframe for the same transport block as described above, and $M_{sc}^{PUSCH-initial}$ represents the number of subcarriers. $N_{symb}^{PUSCH-initial}$ corresponds to Equation 5 shown below.

$$N_{symb}^{PUSCH-initial} = (2 \cdot (N_{symb}^{UL} - 1) - N_{SRS})$$ [Equation 5]

Herein, when the user equipment transmits a PUSCH and an SRS within the same subframe for an initial transmission (or transport), or when the PUSCH resource allocation for an initial transmission (or transport) overlaps, even partially, with the subframe and frequency bandwidth of a cell-specific SRS, $N_{SRS}$ may be set to have a value of 1, and in other cases $N_{SRS}$ may be set to have a value of 0.

$M_{sc}^{PUSCH-initial}$, C, and $K_r^{(x)}$, x={0,1} may be obtained from an initial PDCCH for the same transport block as described above. In case $M_{sc}^{PUSCH-initial}$, C, and $K_r^{(x)}$, x={0,1} are not included in the initial PDCCH (DCI format 0 or 4), the corresponding values may be decided by using another method. More specifically, when the initial PUSCH for the same transport block as described above is processed with semi-persistent scheduling, and when the PUSCH has most recently been initialized by the PDCCH, which has directed the semi-persistent scheduling, or by a random access response grant, $M_{sc}^{PUSCH-initial}$, C, and $K_r^{(x)}$, x={0,1} may be decided by a random access response grant for the sane transport block as described above.

As described above, once the number of resource elements for the ACK/NACK (or RI) is obtained, the number of bits after performing channel coding of the ACK/NACK (or RI) may be obtained based upon the modulation method (or scheme). A total number of coded bits of the ACK/NACK may correspond to $Q_{CQI} = Q_m \cdot Q'$, and a total number of coded bits of the ACK/NACK may correspond to $Q_{RI} = Q_m \cdot Q'$. Herein, $Q_m$ corresponds to a number of bits per symbol with respect to the modulation order, and, in case of QPSK, $Q_m$ is equal to 2, in case of 16QAM, $Q_m$ is equal to 4, and in case of 64QAM, $Q_m$ is equal to 6.

Meanwhile, when the SNR or spectral efficiency is high, rate matching may be applied as puncturing and, by using an RM (Reed-Muller) code, rate matching may decide a minimum value of the resource element being allocated to the ACK/NACK and the RI, so as to prevent a minimum distance of a coded codeword from being equal to 0. At this point, the defined minimum value of the resource element may have a different value depending upon the information bit size of the ACK/NACK or the RI.

2. 5. UCI Channel Coding 2. 5. 1. Channel Coding for CQI

For the CQI, a channel coding method may be differently applied depending upon the number of bits. More specifically, when a payload size of the CQI is less than or equal to 11 bits, the channel coding of the CQI is performed by using the input sequence $o_0, o_1, o_2, \ldots, o_{O-1}$, which is described above in FIG. 13, and, by applying the RM (Reed-Muller) coding method using Table 1 shown below, an output sequence of 32 bits is generated.

However, when the payload size of the CQI exceeds 11 bits, an 8-bit CRC is added. More specifically, an input sequence respective to the CRC adding step corresponds to $o_0, o_1, o_2, \ldots, o_{O-1}$, as described above, and an output sequence of the CRC adding step is identical to the input sequence of the channel coding step. At this point, a TBCC (Tail Biting Convolutional Coding) method may be applied as the channel coding method. Subsequently, the output sequence of the channel coding step is identical to the input sequence of the rate matching step.

Table 1 shown below indicates a basis sequence of (32,0) RM code.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 0 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 1 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

2.5.2. Channel Coding for ACK/NACK

When the information bit of ACK/NACK is equal to 1 bit, the input sequence may be expressed as $[o_0^{ACK}]$, and channel coding may be performing in accordance with the modulation order as shown below in Table 2. Qm corresponds to a number of bits per symbol with respect to the modulation order, and, in case of QPSK, 16QAM, 64QAM, the Qm value is respectively equal to 2, 4, 6.

TABLE 2

| $Q_m$ | Encoded HARQ-ACK |
|---|---|
| 2 | $[o_0^{ACK} \, y]$ |
| 4 | $[o_0^{ACK} \, y \, x \, x]$ |
| 6 | $[o_0^{ACK} \, y \, x \, x \, x \, x]$ |

When the information bit of ACK/NACK is equal to 2 bits, this may be expressed as $[o_0^{ACK} \, o_1^{ACK}]$, and channel coding may be performing in accordance with the modulation order as shown below in Table 3. At this point, $o_0^{ACK}$ corresponds to an ACK/NACK bit for codeword 0, and $o_1^{ACK}$ corresponds to an ACK/NACK bit for codeword 1, and $o_2^{ACK} = (o_0^{ACK} + o_1^{ACK}) \bmod 2$. In Table 2 and Table 3, x and y each refers to a placeholder for scrambling the ACK/NACK information in order to maximize a Euclidean distance of the modulation symbol, which delivers the ACK/NACK information.

TABLE 3

| $Q_m$ | Encoded HARQ-ACK |
|---|---|
| 2 | $[o_0^{ACK} \, o_1^{ACK} \, o_2^{ACK} \, o_0^{ACK} \, o_1^{ACK} \, o_2^{ACK}]$ |
| 4 | $[o_0^{ACK} \, o_1^{ACK} \, x \, x \, o_2^{ACK} \, o_0^{ACK} \, x \, x \, o_1^{ACK} \, o_2^{ACK} \, x \, x]$ |
| 6 | $[o_0^{ACK} \, o_1^{ACK} \, x \, x \, x \, x \, o_2^{ACK} \, o_0^{ACK} \, x \, x \, x \, x \, o_1^{ACK} \, o_2^{ACK} \, x \, x \, x \, x]$ |

In case of the ACK/NACK multiplexing in the FDD (Frequency Division Duplex) or TDD, when the ACK/NACK is configured of 1 bit or 2 bits, the bit sequence $q_0^{ACK}, q_1^{ACK}, q_2^{ACK}, \ldots, q_{Q_{ACK}-1}^{ACK}$ is generated from a concatenation of multiple coded ACK/NACK blocks. Additionally, in case of the ACK/NACK bundling in the TDD, the bit sequence $\tilde{q}_0^{ACK}, \tilde{q}_1^{ACK}, \tilde{q}_2^{ACK}, \ldots, \tilde{q}_{Q_{ACK}-1}^{ACK}$ is also generated from the concatenation of multiple coded ACK/NACK blocks. At this point, $Q_{ACK}$ indicates the total number of coded bits respective to all coded ACK/NACK blocks. The last concatenation of the coded ACK/NACK blocks may be partially configured so that the length of the total bit sequence can be equal to that of the $Q_{ACK}$.

The scrambling sequence $[w_0^{ACK} w_1^{ACK} w_2^{ACK} w_3^{ACK}]$ may be selected from Table 4 shown below, and index i for selecting the scrambling sequence is calculated by using Equation 6.

$$i(N_{bundled}-1) \bmod 4 \qquad \text{[Equation 6]}$$

Table 4 corresponds to a scrambling sequence selection table for TDD ACK/NACK bundling.

TABLE 4

| i | $[w_0^{ACK} w_1^{ACK} w_2^{ACK} w_3^{ACK}]$ |
|---|---|
| 0 | [1 1 1 1] |
| 1 | [1 0 1 0] |
| 2 | [1 1 0 0] |
| 3 | [1 0 0 1] |

When the ACK/NACK corresponds to 1 bit, the value m may be set to m=1, and when the ACK/NACK corresponds to 2 bits, the value m may be set to m=3, thereby generating bit sequence $q_0^{ACK}, q_1^{ACK}, q_2^{ACK}, \ldots, q_{Q_{ACK}-1}^{ACK}$, and the algorithm for generating the scrambling bit sequence $q_0^{ACK}, q_1^{ACK}, q_2^{ACK}, \ldots, q_{Q_{ACK}-1}^{ACK}$, corresponds to Table 5 shown below.

TABLE 5

Scrambling bit sequence generating algorithm

```
Set i,k to 0
while i < Q_ACK
    if q̃_i^ACK = y              // place-holder repetition bit
        q_i^ACK = (q̃_{i-1}^ACK + w_{⌊k/m⌋}^ACK) mod 2
        k = (k + 1) mod 4m
    else
        if q̃_i^ACK = x           // a place-holder bit
            q_i^ACK = q̃_i^ACK
        else                     // coded bit
            q_i^ACK = (q̃_i^ACK + w_{⌊k/m⌋}^ACK) mod 2
            k = (k + 1) mod 4m
        end if
    i = i + 1
end while
```

2.5.3. Channel Coding for RI

When the information bit of ACK/NACK (or RI) is equal to 1 bit, the input sequence may be expressed as $[o_0^{RI}]$, and channel coding may be performing in accordance with the modulation order as shown below in Table 6. Qm corresponds to a number of bits per symbol with respect to the modulation order, and, in case of QPSK, 16QAM, 64QAM, the Qm value is respectively equal to 2, 4, 6. The mapping between $[o_0^{RI}]$ and RI is as shown below in Table 7.

TABLE 6

| $Q_m$ | Encoded RI |
|---|---|
| 2 | $[o_0^{RI} \, y]$ |
| 4 | $[o_0^{RI} \, y \, x \, x]$ |
| 6 | $[o_0^{RI} \, y \, x \, x \, x \, x]$ |

TABLE 7

| $o_0^{RI}$ | RI |
|---|---|
| 0 | 1 |
| 1 | 2 |

When the information bit of RI is equal to 2 bits, this may be expressed as $[o_0^{RI} \, o_1^{RI}]$, and channel coding may be performing in accordance with the modulation order as shown below in Table 8. At this point, $o_0^{RI}$ corresponds to an MSB (Most Significant Bit) of the 2-bit input, and $o_1^{RI}$ corresponds to an LSB (Least Significant Bit) of the 2-bit input, and $o_2^{RI} = (o_0^{RI} + o_1^{RI}) \bmod 2$. The mapping between $[o_0^{RI} \, o_1^{RI}]$ and the RI is as shown in below in Table 9.

In Table 6 and Table 8, x and y each refers to a placeholder for scrambling the RI information in order to maximize a Euclidean distance of the modulation symbol, which delivers the RI information.

The bit sequence $q_0^{RI}, q_1^{RI}, q_2^{RI}, \ldots, q_{Q_{RI}-1}^{RI}$ is generated from the concatenation of multiple coded RI blocks. At this point, $Q_{RI}$ indicates the total number of coded bits respective to all coded RI blocks. The last concatenation of the coded RI blocks may be partially configured so that the length of the total bit sequence can be equal to that of the $Q_{RI}$.

Meanwhile, when the information bit of the RI (or ACK/NACK in 2.5.2.) is equal to or greater than 3 bits and less than or equal to 11 bits, RM (Reed-Muller) coding using Table 1, as described above, is applied, so as to generate an output sequence of 32 bits.

The RI (or ACK/NACK) blocks $b_0, b_1, b_2, b_3, \ldots, b_{B-1}$, which are processed with RM (Reed-Muller) coding using Table 1, is calculated by using Equation 7 shown below. Herein, i=0, 1, 2, ..., B-1, and B=32.

$$b_i = \sum_{n=0}^{O-1} (o_n \cdot M_{i,n}) \bmod 2 \quad \text{[Equation 7]}$$

2.6. UCI Rate Matching

The UCI $b_0, b_1, b_2, b_3, \ldots, b_{B-1}$, which is coded to B number of bits by using the RM (Reed-Muller) code using Table 1, may be processed with rate matching by using Equation 8 shown below, in order to map the Q' number of resource elements, which are calculated in accordance with Equation 1 or Equation 4, as described above.

$$q_i = b_{i \bmod B}, i=0,1,\ldots,Q_m \times Q'-1 \quad \text{[Equation 8]}$$

3. General Description of the Channel Coding Method in a Carrier Aggregation System

3.1. General Description of the Carrier Aggregation System

A 3GPP LTE-A system supports a carrier aggregation system. When a wireless communication system seeks to support a wideband, the carrier aggregation system refers to a system configuring a wideband by collecting (or aggregating) one carrier or more each carrier having a bandwidth smaller than that of the wideband. The carrier aggregation system may also be referred to as other terms, such as a multiple carrier system, a Bandwidth aggregation system, and so on. The carrier aggregation system may be divided into a contiguous carrier aggregation system, wherein each carrier is contiguously configured, and a non-contiguous carrier aggregation system, wherein each carrier is spaced apart from one another. Hereinafter, when reference is simply made to a multiple carrier system or a carrier aggregation system, it should be understood that the corresponding system includes both of the case when the component carriers are contiguously configured and the case when the component carriers are non-contiguously configured.

In the contiguous carrier aggregation system, a guard band may exist between each carrier. When aggregating one or more carriers, in order to gain backward compatibility with the conventional system, the targeted carrier may use the same bandwidth as that used in the conventional system without any modification. For example, the conventional 3GPP LTE system supports bandwidths of 1.4 MHz, 3 MHz, 5 MHz, 10 MHz, 15 MHz, and 20 MHz, and the 3GPP LTE-A system may configure a wideband of 20 MHz or more by using only the bandwidth of the 3GPP LTE system. Alternatively, instead of using the bandwidth of the conventional system without any modification, a new bandwidth may be defined, so as to configure the wideband.

In the carrier aggregation system, depending upon its capacity, the user equipment may transmit or receive one carrier or multiple carriers at the same time. For example, the LTE-A user equipment may transmit or receive multiple carriers at the same time. Conversely, when each carrier configuring the carrier aggregation system is backward compatible with the conventional system (LTE Rel-8), a legacy user equipment (e.g., LTE Rel-8) may transmit or receiver only one carrier. Therefore, at least when the number of carriers used in the uplink is identical to the number of carriers used in the downlink, all of the element carriers are required to be configured to ensure backward compatibility with the conventional system.

Although the related art channel coding is implemented under the assumption of a single carrier environment, when a multiple carrier method is applied as in the 3GPP LRE-A system, since the UCI, i.e., the ACK/NACK or RI information, is generally aggregated by an order of the component carriers, the size of the UCI may also increase in proportion to the number of aggregated component carriers. Most particularly, in the conventional single carrier, the RI may have a maximum size of up to 3 bits. However, in an environment where 5 component carriers can be aggregated, the RI may have a maximum size of up to 15 bits. Therefore, in the currently implemented RM coding method, since a maximum of 11 bits of the UCI can be coded, a new method for coding the UCI in a multiple carrier environment is required.

Hereinafter, a channel coding method of a UCI, when the UCI, such as the ACK/NACK and RI, has a large payload size will be described in detail. For simplicity, although the description will be made based upon a transmission in the SU-MIMO environment, the following description may also be applied to a single antenna transmission, may correspond to a particular case of the SU-MIMO.

3. 1. Proposed Channel Coding Method

When PUSCH resource is not allocated for the data transmission in the corresponding subframe in order to transmit the UCI, the user equipment transmit the UCI by using a pre-determined PUCCH. Hereinafter, when a PUSCH resource is allocated, it will be assumed that ACK/NACK or RI information is transmitted through the PUSCH.

Since channel coding may be performed by using the above-described method, when the number of bits of the ACK/NACK or RI information is within the range of 1 bit to 11 bits, hereinafter, it will be assumed that the number of bits of the ACK/NACK or RI information exceeds 11 bits.

3. 1. 1. Application of TBCC Coding Method

When the number of bits of the ACK/NACK or RI information is equal to or greater than 12 bits, in order to perform channel coding on the ACK/NACK or RI, a TBCC method may be used instead of using the conventional (32,0)RM coding method. At this point, the TBCC used herein may be identical to the TBCC that is used for encoding the CQI of 12 bits or more.

3. 1. 2. Application of (32,0)RM and TBCC Coding Method

When the number of bits of the ACK/NACK or RI information is equal to or greater than 12 bits, the ACK/NACK and RI information may be grouped to two or more groups, and channel coding may be performed on each of the divided sets of information data by using the (32,0)RM coding method, which is used in the PUSCH. At this point, each group may have the same number of bits, or each group may have a different number of bits.

More specifically, in the multiple carrier environment, when UCI, such as the RI or ACK/NACK, is multiplexed with data, the UCI information is divided into two or more groups, and each group may be coded as a single codeword. When the number of bits of the UCI, which is divided into two or more groups, is within the range of 3 bits to 11 bits, the (32,0)RM coding method using Table 1 may be applied.

For example, when the number of bits of the ACK/NACK or RI is within the range of 12 bits to 22 bits, the ACK/NACK or RI is divided into 2 groups, and the (32,0)RM coding method, i.e., a dual RM coding method may be applied to each group. Conversely, when the number of bits of the ACK/NACK or RI is equal to 23 bits or more, TBCC may be used instead of the dual RM coding method. At this point, the TBCC that is used herein may be identical to the TBCC that is used for coding a CQI of 12 bits or more.

Hereinafter, although the description provided above corresponds to a case when the ACK/NACK or RI information is divided into 2 groups for simplicity, the present invention will not be limited to the description provided herein.

3. 1. 3. Channel Coding Method

Figure 19:
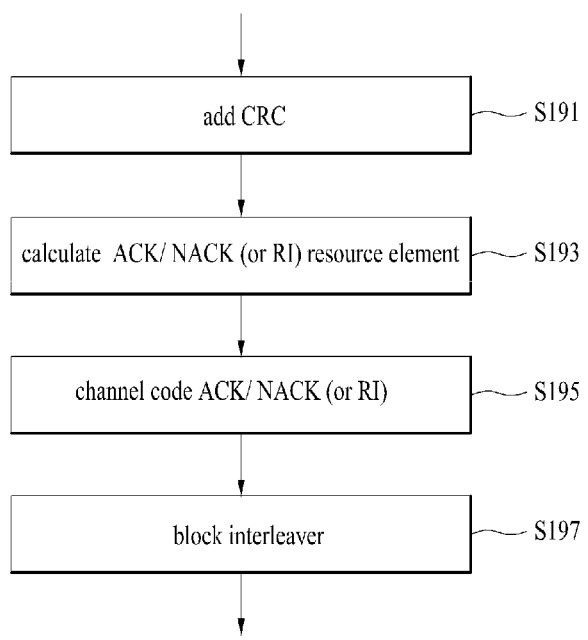
FIG. 19 illustrates a process of applying a channel encoding method to uplink control information according to an exemplary embodiment of the present invention.

FIG. 19 illustrates a process of applying a channel encoding method to uplink control information according to an exemplary embodiment of the present invention. FIG. 19 may be applied to other the above-described (3. 1. 1.) and (3. 1. 2.).

Referring to FIG. 19, when the number of bits of the ACK/NCK or RI information is equal to 12 bits (3. 1. 1.) or 23 bits (3. 1. 2.) or more, in order to determine whether or not an error exists in the ACK/NACK or RI, a predetermined CRC may be added to the information code of the ACK/NACK (S191).

Firstly, an 8-bit CRC, which is identical to the CRC that is added for channel coding of the CQI, may be used and added to the ACK/NACK or RI information.

Secondly, a 4-bit CRC may be generated and added to the ACK/NACK or RI. In this case, for a polynomial equation $g_4$ (D), which is used for generating the 4-bit CRC, any one of the equations shown below in Equation 9 may be used.

$$g_4(D)=D^4+D^3+D^2+D+1$$
$$g_4(D)=D^4+D^3+D^2+1$$
$$g_4(D)=D^4+D^3+D+1$$
$$g_4(D)=D^4+D^3+1$$
$$g_4(D)=D^4+D^2+D+1$$
$$g_4(D)=D^4+D^2+1$$
$$g_4(D)=D^4+D+1 \quad \text{[Equation 9]}$$

Thirdly, a 6-bit CRC may be generated and added to the ACK/NACK or RI. In this case, any one polynomial equation $g_6(D)$, which is used for generating the 6-bit CRC, may be used. Herein, $g_6(D)$ may corresponds to a degree 6 equation having a similar format as $g_4(D)$ Fourthly, instead of using the CRC for the channel coding of the ACK/NACK or RI, TBCC may be used to perform channel coding.

After adding the CRC to the information of the ACK/NACK or RI in step S191, a number of resource elements for the PUSCH transmission of the ACK/NACK or RI is calculated (S193).

At this point, in case the TBCC is used for the channel coding of the ACK/NACK or RI, when calculating the resource elements for the PUSCH transmission of the ACK/NACK or RI, the number of CRC bits shall also be taken into consideration. Therefore, Equation 4, which is used for calculating the resource elements for the PUSCH transmission of the ACK/NACK or RI, may be changed to Equation 10 shown below. Herein, the number of resource elements for the PUSCH transmission of the ACK/NACK or RI may be expressed as the number ($Q'$) of coded modulation symbols.

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right) \quad \text{[Equation 10]}$$

Hereinafter, a detailed description of the same variables that are used in Equation 4 will be omitted.

In Equation 10, O represents a number of bits of the ACK/NACK (or RI), and L is further added to the above-described Equation 4. Herein, L represents the number of CRC bits, and when O is less than or equal to 11 bits, L may have the value of 0. More specifically, at this point, the above-described (32,0)RM coding method may be used for performing channel coding of the ACK/NACK (or RI).

- When O is equal to or greater than 12 bits (3. 1. 1.), L corresponds to a value of the number of CRC bits, which is decided in step S191. However, even if the channel coding is performed by using the TBCC, as described above, if the CRC is not added, L may have the value of 0.
- When O is equal to or greater than 23 bits (3. 1. 2.), L corresponds to a value of the number of CRC bits, which is decided in step S191. In this case, when O is equal to or less than 22 bits, L may have the value of 0. This is because, if the dual RM coding method is used, as described above, channel coding may be performed on the information bits of the ACK/NACK (or RI) within the range of 12 bits to 22 bits. However, in this case also, if the CRC is not added, L may have the value of 0.

After calculating the resource elements for the PUSCH transmission of the ACK/NACK or RI in step S193, channel coding of the ACK/NACK or RI is performed (S195).

When the number of bits of the ACK/NACK or RI is equal to or greater than 12 bits (3. 1. 1.), channel coding is performed by using the TBCC.

When the number of bits of the ACK/NACK or RI is equal to or greater than 23 bits (3. 1. 2.), channel coding is performed by using the TBCC. At this point, when the number of bits of the ACK/NACK or RI is within the range of 12 bits to 22 bits, the dual RM coding method is used.

After performing channel coding of the ACKJNACK or RI in step S195, a block interleaver may be applied (S197).

In order to enhance the transmission performance of the uplink control information, the block interleaver may be applied before performing rate matching. At this point, the interleaver that is applied herein may correspond to the same interleaver being applied to the CQI.

3. 1. 4. Application to Multiple Input Multiple Output (MIMO) System

The resource of the ACK/NACK or RI is decided by the size $M_{sc}^{PUSCH-initial}$ of a physical resource block of the PUSCH for transmitting an initial transport block and by a number $N_{symb}^{PUSCH-initial}$ of initial transport block symbols. More specifically, the size of the symbols and subcarriers of the initial transport block may be a reference size for deciding the size of the resource of the ACK/NACK or RI. This disregards whether or not the PUSCH, which re-transmits the ACK/NACK or RI, is multiplexed with the SRS.

In the SU-MIMO environment, when a first transport block (TB 0) and a second transport block (TB 1) are initially transmitted, if each of the two transport blocks is transmitted from a different block, $M_{sc}^{PUSCH-initial}$ and $N_{symb}^{PUSCH-initial}$ may be unclear. For example, when TB 0 is transmitted in accordance with an initial transmission (or transport), when TB 1 is transmitted in accordance with a re-transmission (or re-transport), and when the re-transmission has a symbol or subcarrier size different from that of the initial transmission subframe, it may be unclear in deciding the resource size of the ACK/NACK or RI based upon the symbol and subcarrier size of which specific subframe Therefore, in this case, the reference value of each transport block may be differently set up.

When using the TBCC for the channel coding of the ACK/NACK or RI, an equation for calculating the resource element of the ACK/NACK or RI corresponds to Equation 11 shown below. In (3. 1. 4.), in step S193, the resource element of the ACK/NACK or RI may use Equation 11 shown below. Herein, the number of resource elements for the ACK/NACK or RI may be expressed as the number (Q') of coded modulation symbols.

$$Q' = \min\left(\left\lceil\frac{(O+L)\cdot \beta_{offset}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}}\right\rceil, 4\cdot M_{sc}^{PUSCH}\right)$$ [Equation 11]

Hereinafter, a detailed description of the same variables that are used in Equation 4 or Equation 10 will be omitted.

In Equation 11, L represents the number of CRC bits, and when O is less than or equal to 11 bits, L may have the value of 0. Conversely, when O is equal to or greater than 12 bits (3. 1. 1.), or when O is equal to or greater than 23 bits (3. 1. 2.), L may have the value of 8.

$M_{sc}^{PUSCH(i)}$ indicates a bandwidth, which is allocated (scheduled) to an $i^{th}$ codeword for the PUSCH transmission within a current subframe for the transport block, as a sub-carrier, and $M_{sc}^{PUSCH}$ may indicate a bandwidth allocated to the entire codewords.

$N_{symb}^{PUSCH-initial(i)}$ indicates the number of SC-FDMA symbols per subframe of the $i^{th}$ codeword during the initial PUSCH transmission for the same transport block, and $M_{sc}^{PUSCH-initial(i)}$ represents the number of subcarriers. i indicates a codeword index.

3. 1. 5. Setting Up Minimum Value of Resource Element

In case of using the TBCC in order to perform channel coding of the ACK/NACK or RI, a minimum value of the resource element may be set up in order to ensure channel coding performance.

The minimum resource element value may be equally set up regardless of the number of control information bits, or may be differently set up depending upon the number of control information bits. The minimum resource element value may be decided as shown below in Equation 12.

$$Q'_{min} = \left\lceil\frac{2\times O}{Q_m}\right\rceil$$ [Equation 12]

O represents a number of bits of the ACK/NACK (or RI), $Q_m$ corresponds to a number of bits per symbol with respect to the modulation order, and, in case of QPSK, $Q_m$ is equal to 2, in case of 16QAM, $Q_m$ is equal to 4, and in case of 64QAM, $Q_m$ is equal to 6.

4. General Description of a Device to which the Present Invention May be Applied FIG. 20 illustrates a block view showing a structure of a communication apparatus according to an embodiment of the present invention.

Figure 20:
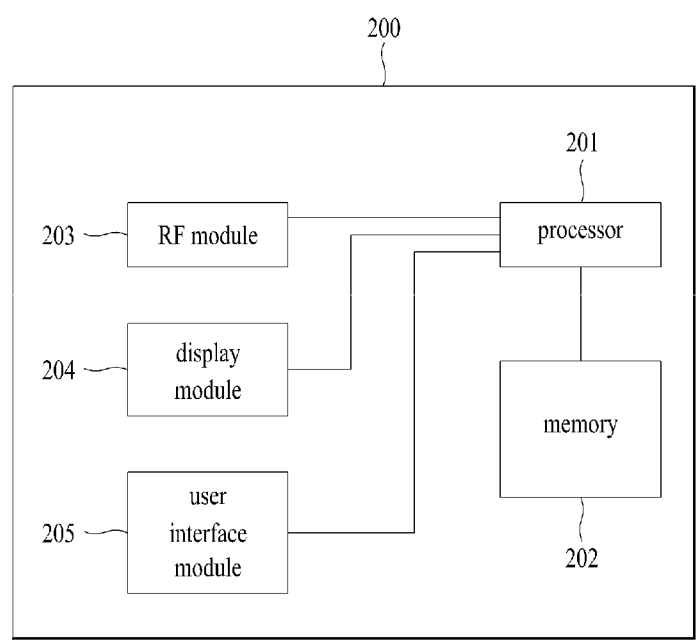
FIG. 20 illustrates a block view showing a structure of a communication apparatus according to an embodiment of the present invention.

Referring to FIG. 20, a user equipment (200) includes a processor (201), a memory (202), an RF module (203), a display module (204), and a user interface module (205).

As an exemplary illustration provided to simplify the description of the present invention, partial modules of the user equipment (200) may be omitted, and some necessary modules may be further included. Also, in the user equipment (200), some of the modules may be divided into more segmented modules.

An example of the processor (201) is configured to perform operations according to the embodiment of the present invention. More specifically, for the detailed operations of the processor (201), reference may be made to the description of the present invention shown in FIG. 1 to FIG. 19.

The memory (202) is connected to the processor (201) and stores operating systems, applications, program codes, data, and so on. The RF module (203) is connected to the processor (201) and performs a function of converting baseband signals to radio (or wireless) signals or converting radio signals to baseband signals. In order to do so, the RF module (203) performs analog conversion, amplification, filtering, and frequency uplink conversion or inverse processes of the same. The display module (204) is connected to the processor (201) and displays diverse information. The display module (204)

will not be limited only to the example given herein. In other words, generally known elements, such as LCD (Liquid Crystal Display), LED (Light Emitting Diode), OLED (Organic Light Emitting Diode) may also be used as the display module (204). The user interface module (205) is connected to the processor (201), and the user interface module (205) may be configured of a combination of generally known user interfaces, such as keypads, touchscreens, and so on. Furthermore, the user equipment (200) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the base station and the terminal (or user equipment). Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on. Additionally, the term User Terminal (or user equipment) may be replaced by other terms, such as UE (User Equipment), MS (Mobile Station), MSS (Mobile Subscriber Station), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although an uplink control information transmitting method in a wireless communication system of the present invention is described based upon an example that can be applied to a 3GPP LTE system, the method of the present invention may also be applied to a variety of other wireless communication system in addition to the 3GPP LTE system.

What is claimed is:

1. A method for transmitting Uplink Control Information in a wireless communication system, the method comprising:
adding a CRC (Cyclic Redundancy Check) to the uplink control information when a bit size of the uplink control information is equal to or greater than a predetermined number;
calculating a number of radio resource elements for transmitting the uplink control information having the CRC added thereto;
coding the uplink control information having the CRC added thereto by using a TBCC (Tail Biting Convolutional Coding) coding method in accordance with the calculated number of radio resource elements; and
transmitting a Physical Uplink Shared Channel signal having the coded uplink control information included therein to a base station,
wherein the uplink control information corresponds to any one of HARQ-ACK/NACK (Hybrid Automatic Repeat and reQuest Acknowledgement/Negative-ACK) information and RI (Rank Indication) information.

2. The method of claim 1, further comprising:
performing rate matching after applying a block interleaver to the coded uplink control information.

3. The method of claim 1, wherein the bit size of the CRC is equal to any one of 4 bits, 6 bits, and 8 bits.

4. The method of claim 1, wherein the predetermined number is equal to any one of 12 bits and 23 bits.

5. The method of claim 1, wherein the step of calculating a number of radio resource elements, the number of radio resource elements is calculated by using a number of subcarriers and a number of symbols of a physical uplink shared channel for an initially transmitted transport block.

6. The method of claim 5, wherein the step of calculating a number of radio resource elements, the number (Q') of radio resource elements is calculated in accordance with an Equation shown below, wherein a number of bits of the uplink control information is equal to O, and wherein a number of bits of the CRC is equal to L $$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right).$$ ⟨Equation⟩

7. The method of claim 1, wherein the step of calculating a number of radio resource elements, when two or more transport blocks are each initially transmitted from a different subframe, the number of radio resource elements is calculated by using a number of subcarriers and a number of symbols of a physical uplink shared channel for each of the initially transmitted subframes.

8. The method of claim 7, wherein the step of calculating a number of radio resource elements, the number (Q') of radio resource elements is calculated in accordance with an Equation shown below, wherein a number of bits of the uplink control information is equal to O, and wherein a number of bits of the CRC is equal to L $$Q' = \min\left(\left\lceil \frac{(O+L) \cdot \beta_{offset}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}} \right\rceil, 4 \cdot M_{sc}^{PUSCH}\right).$$ ⟨Equation⟩

9. A user equipment for transmitting Uplink Control Information in a wireless communication system, the user equipment comprises:
a RF (Radio Frequency) unit; and
a processor configured to add a CRC (Cyclic Redundancy Check) to the uplink control information, when a bit size of the uplink control information is equal to or greater than a predetermined number, to calculate a number of radio resource elements for transmitting the uplink control information having a CRC added thereto, to perform coding by using a TBCC (Tail Biting Convolutional Coding) coding method in accordance with the calculated number of radio resource elements, and to transmit a Physical Uplink Shared Channel signal having the coded uplink control information included therein to a base station,
wherein the uplink control information corresponds to any one of HARQ-ACK/NACK (Hybrid Automatic Repeat and reQuest Acknowledgement/Negative-ACK) information and RI (Rank Indication) information.

10. The user equipment of claim 9, further comprising:
a step of performing rate matching after applying a block interleaver to the coded uplink control information.

11. The user equipment of claim 9, wherein the bit size of the CRC is equal to any one of 4 bits, 6 bits, and 8 bits.

12. The user equipment of claim 9, wherein the predetermined number is equal to any one of 12 bits and 23 bits.

13. The user equipment of claim 9, wherein the number of radio resource elements is calculated by using a number of subcarriers and a number of symbols of a physical uplink shared channel for an initially transmitted transport block.

14. The user equipment of claim 13, wherein the number (Q') of radio resource elements is calculated in accordance with an Equation shown below, wherein a number of bits of the uplink control information is equal to O, and wherein a number of bits of the CRC is equal to L $$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right).$$ ⟨Equation⟩

15. The user equipment of claim 9, wherein, when two or more transport blocks are each initially transmitted from a different subframe, the number of radio resource elements is calculated by using a number of subcarriers and a number of symbols of a physical uplink shared channel for each of the initially transmitted subframes.

16. The user equipment of claim 15, wherein the number (Q') of radio resource elements is calculated in accordance with an Equation shown below, wherein a number of bits of the uplink control information is equal to O, and wherein a number of bits of the CRC is equal to L $$Q' = \min\left(\left\lceil \frac{(O+L) \cdot \beta_{offset}^{PUSCH}}{\frac{\sum_{r=0}^{C^0-1} K_r^0}{M_{sc}^{PUSCH-initial(0)} \cdot N_{symb}^{PUSCH-initial(0)}} + \frac{\sum_{r=0}^{C^1-1} K_r^1}{M_{sc}^{PUSCH-initial(1)} \cdot N_{symb}^{PUSCH-initial(1)}}} \right\rceil, 4 \cdot M_{sc}^{PUSCH}\right).$$ ⟨Equation⟩

* * * * *